(12) United States Patent
Amikawa et al.

(10) Patent No.: US 11,683,600 B2
(45) Date of Patent: Jun. 20, 2023

(54) SOLID-STATE IMAGING APPARATUS, IMAGING APPARATUS, AND IMAGING METHOD

(71) Applicant: Nuvoton Technology Corporation Japan, Kyoto (JP)

(72) Inventors: Hiroyuki Amikawa, Ishikawa (JP); Makoto Ikuma, Hyogo (JP); Kazutoshi Onozawa, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 23 days.

(21) Appl. No.: 17/523,511

(22) Filed: Nov. 10, 2021

(65) Prior Publication Data

US 2022/0070396 A1 Mar. 3, 2022

Related U.S. Application Data

(63) Continuation of application No. PCT/JP2020/019317, filed on May 14, 2020.

(30) Foreign Application Priority Data

May 31, 2019 (JP) .............................. JP2019-103379

(51) Int. Cl.
*H04N 25/59* (2023.01)
*H04N 25/53* (2023.01)
*H04N 25/60* (2023.01)
*H04N 25/771* (2023.01)

(52) U.S. Cl.
CPC ............. *H04N 25/59* (2023.01); *H04N 25/53* (2023.01); *H04N 25/60* (2023.01); *H04N 25/771* (2023.01)

(58) Field of Classification Search
CPC ........ H04N 25/59; H04N 25/53; H04N 25/60; H04N 25/771; H04N 25/57
See application file for complete search history.

(56) References Cited

U.S. PATENT DOCUMENTS

2008/0036888 A1* 2/2008 Sugawa ............... H04N 25/585
348/294
2009/0303371 A1 12/2009 Watanabe et al.
(Continued)

FOREIGN PATENT DOCUMENTS

JP 2006-217410 A 8/2006
JP 2010-114274 A 5/2010
(Continued)

OTHER PUBLICATIONS

International Search Report and Written Opinion dated Jun. 16, 2020 in International Patent Application No. PCT/JP2020/019317; with partial English translation.

*Primary Examiner* — Nhan T Tran
(74) *Attorney, Agent, or Firm* — McDermott Will & Emery LLP

(57) ABSTRACT

A solid-state imaging apparatus includes pixel cells arranged in a matrix. Each pixel cell includes: a first photodiode that accumulates a signal charge generated by photoelectric conversion; a second photodiode that functions as a first holder that holds a signal charge that overflows from the first photodiode; a second holder; and a first transfer transistor that transfers the signal charge held in the second photodiode to the second holder.

19 Claims, 23 Drawing Sheets

(56) References Cited

U.S. PATENT DOCUMENTS

| | | | |
|---|---|---|---|
| 2012/0044396 A1* | 2/2012 | Rysinski | H04N 25/771 |
| | | | 348/E5.091 |
| 2013/0044247 A1* | 2/2013 | Kawahito | H04N 25/771 |
| | | | 348/E5.091 |
| 2016/0111461 A1* | 4/2016 | Ahn | H04N 25/59 |
| | | | 257/225 |
| 2017/0092683 A1* | 3/2017 | Geurts | H01L 27/14605 |
| 2017/0359538 A1 | 12/2017 | Kobayashi et al. | |
| 2018/0124335 A1* | 5/2018 | Machida | H01L 27/307 |
| 2019/0166291 A1* | 5/2019 | Magnani | H04N 25/53 |
| 2019/0349547 A1* | 11/2019 | Velichko | H01L 25/167 |
| 2020/0260026 A1 | 8/2020 | Ono et al. | |

FOREIGN PATENT DOCUMENTS

| | | |
|---|---|---|
| JP | 2017-220896 A | 12/2017 |
| JP | 2019-080305 A | 5/2019 |
| WO | 2017/169216 A1 | 10/2017 |

* cited by examiner

SOLID-STATE IMAGING APPARATUS, IMAGING APPARATUS, AND IMAGING METHOD

CROSS REFERENCE TO RELATED APPLICATIONS

This is a continuation application of PCT International Application No. PCT/JP2020/019317 filed on May 14, 2020, designating the United States of America, which is based on and claims priority of Japanese Patent Application No. 2019-103379 filed on May 31, 2019. The entire disclosures of the above-identified applications, including the specifications, drawings, and claims are incorporated herein by reference in their entirety.

FIELD

The present disclosure relates to a solid-state imaging apparatus, an imaging apparatus, and an imaging method.

BACKGROUND

For example, Patent Literature (PTL) 1 discloses a method for extending the dynamic range in a solid-state imaging apparatus. The solid-state imaging apparatus to which the method of PTL 1 is applied has a single-pixel architecture, and includes an overflow gate that transfers the charge that overflows from the photodiode and a storage capacitive element that accumulates the charge transferred by the overflow gate in response to an accumulation operation. The low-illuminance signal and the high-illuminance signal are combined to extend the dynamic range.

CITATION LIST

Patent Literature

PTL 1: Japanese Unexamined Patent Application Publication No. 2006-217410

SUMMARY

Technical Problem

Unfortunately, with PTL 1, it is not possible to both extend the dynamic range and mitigate flicker.

First, flicker mitigation will be described. In recent years, light-emitting diode light sources (LED light sources) and laser diode light sources (LD lights sources) have come into use. Such light sources often employ dynamic lighting whereby the light source repeatedly turns on and off at a rate so rapid it is undetectable by the naked eye. Stated differently, the light source flickers at a rapid rate that is undetectable by the naked eye. For example, in addition to luminaires, LED light sources are used in traffic lights, vehicle headlights, and vehicle brake lights.

With dynamic light emission, although a light source appears to be continuously on to the naked eye, the flickering affects solid-state imaging apparatuses. When the solid-state imaging apparatus captures an image of such a light source or captures an image of an environment in which such a light source is used, the image may be an image in which the light source is emitting light (or a bright image) or an image in which the light source is not emitting light (or a dark image). In other words, the flickering of the light source is captured in the images. The capturing of the latter image, i.e., the capturing of an image in which the light source is not emitting light (or a dark image), can be said to be substandard capturing. The mitigation of such substandard capturing resulting from light source flicker is referred to as flicker mitigation.

In PTL 1, flicker signals can be mitigated if the exposure time is extended, but the pixel becomes saturated and the dynamic range narrows.

In view of this, the present disclosure provides a solid-state imaging apparatus, an imaging apparatus, and an imaging method capable of both extending the dynamic range and mitigating flicker.

Solution to Problem

A solid-state imaging apparatus that overcomes the above-described problems includes pixel cells arranged in a matrix. Each of the pixel cells includes: a first photodiode that accumulates a signal charge generated by photoelectric conversion; a second photodiode that functions as a first holder that holds a signal charge that overflows from the first photodiode; a second holder; and a first transfer transistor that transfers the signal charge held in the first holder to the second holder.

An imaging apparatus that overcomes the above-described problems includes: the above-described solid-state imaging apparatus; an imaging optical system that guides incident light from a subject to the solid-state imaging apparatus; and a signal processor that processes an output signal from the solid-state imaging apparatus.

An imaging method that overcomes the above-described problems is performed in a solid-state imaging apparatus including pixel cells arranged in a matrix, each of the pixel cells including: a first photodiode that accumulates a signal charge generated by photoelectric conversion; a second photodiode that functions as a first holder that holds a signal charge that overflows from the first photodiode; a second holder; and a first transfer transistor that transfers the signal charge held in the first holder to the second holder. The imaging method includes: exposing the first photodiode; transferring the signal charge that overflows from the first photodiode to the first holder; and transferring the signal charge held in the first holder to the second holder.

Advantageous Effects

With the solid-state imaging apparatus, the imaging apparatus, and the imaging method according to the present disclosure, it is possible to both expand the dynamic range and mitigate flicker.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Embodiment 1

Hereinafter, a solid-state imaging apparatus and a method of driving the same according to Embodiment 1 will be described with reference to the drawings.

Each embodiment described below shows a specific example of the present disclosure. The numerical values, shapes, materials, elements, the arrangement and connection of the elements, steps, order of the steps, etc., indicated in the following embodiments are mere examples, and therefore do not intend to limit the present invention. Therefore, among elements in the following embodiments, those not recited in any of the broadest, independent claims are described as optional elements.

Figure 1:
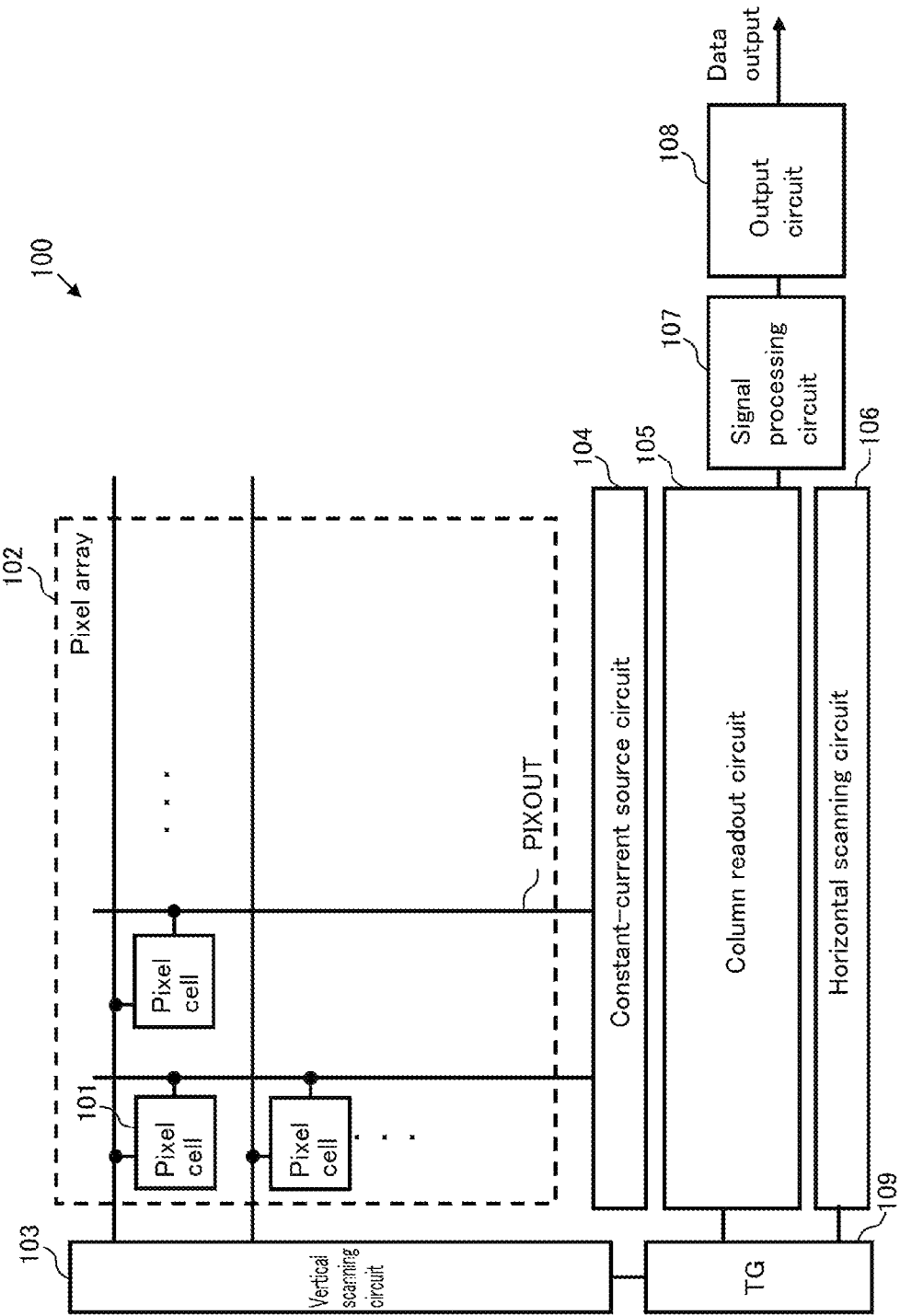
FIG. 1 is a block diagram schematically illustrating an example of a configuration of a solid-state imaging apparatus according to Embodiment 1.

FIG. 1 illustrates a configuration of a solid-state imaging apparatus according to Embodiment 1.

As illustrated in FIG. 1, solid-state imaging apparatus 100 according to the present embodiment includes: pixel array 102 of pixel cells (unit cells) 101 arranged in a matrix, each of the pixel cells including a photoelectric conversion element that performs photoelectric conversion and a transistor; vertical scanning circuit 103 that drives pixel array 102; constant-current source circuit 104; column readout circuit 105; horizontal scanning circuit 106; signal processing circuit 107; output circuit 108; timing generation (TG) circuit 109; and vertical signal lines PIXOUT that transmit signals from pixel cells 101 to respective column circuits. Constant-current source circuit 104 and column readout circuit 105 are connected to vertical signal lines PIXOUT. Column readout circuit 105 includes: a noise canceller (CDS) circuit that receives pixel signals from one column and includes a difference means; and an analog-to-digital conversion circuit (ADC) that receives the pixel signals from the CDS circuit. Analog-to-digital converted data corresponding to the column selected by horizontal scanning circuit 106 is sequentially output to signal processing circuit 107 and signal-processed. The data is then sequentially output out of the solid-state imaging apparatus via output circuit 108. Solid-state imaging apparatus 100 also includes timing generation circuit (TG) 109 that generates a pulse for operating each element.

For example, the CDS circuit included in column readout circuit 105 is connected per column of pixel cells 101 arranged in a matrix in pixel array 102. The CDS circuit performs signal processing on signals output through vertical signal lines PIXOUT from pixel cells 101 in the row selected by vertical scanning circuit 103 that removes fixed pattern noise unique to the pixel that results from reset noise generated in pixel cell 101 by the correlated double sampling (CDS) processing and/or variances in transistor thresholds. The signal-processed pixel signals are then temporarily held.

The analog-to-digital conversion circuit (ADC) includes an auto gain control (AGC) function and an analog-to-digital conversion function. The ADC converts the analog pixel signals held by the CDS circuit into digital signals.

Figure 2:
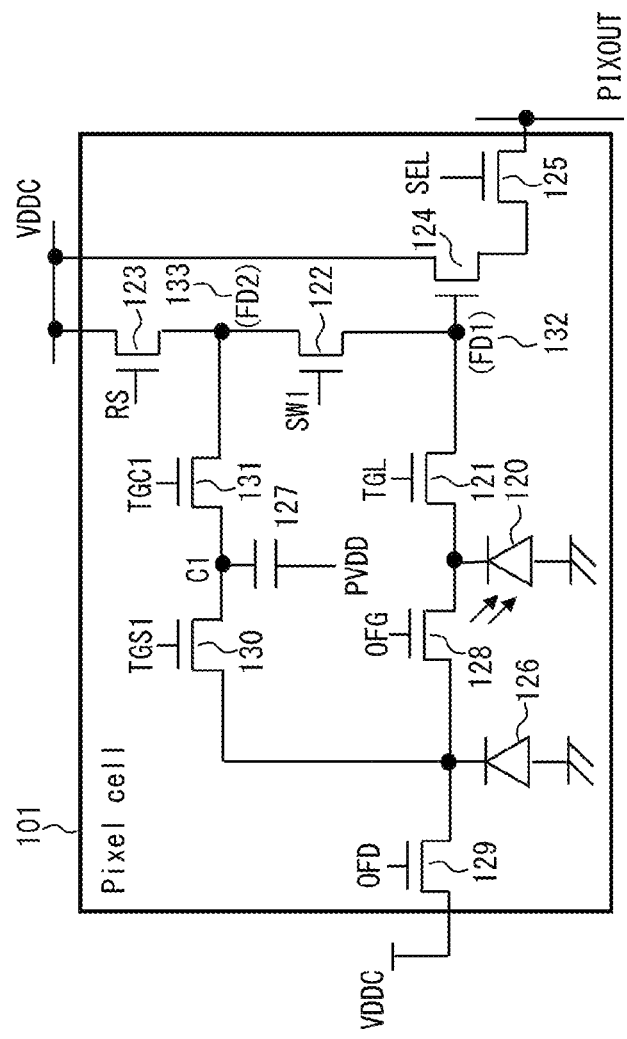
FIG. 2 illustrates an example of a configuration of a pixel included in the solid-state imaging apparatus according to Embodiment 1.

FIG. 2 illustrates an example of a configuration of a pixel included in the solid-state imaging apparatus according to Embodiment 1.

As illustrated in FIG. 2, pixel cell 101 according to this circuit example includes first photodiode 120 that accumulates a signal charge generated by photoelectric conversion, second photodiode 126 that functions as a first holder that holds a signal charge that overflows from first photodiode 120, second holder 127, and first transfer transistor 130 that transfers the signal charge held in the first holder to second holder 127. More specifically, pixel cell 101 includes first photodiode 120, for example, functioning as a photoelectric conversion element, transfer transistor 121, switching transistor 122, reset transistor 123, amplification transistor 124, and selection transistor 125. Pixel cell 101 also includes, second photodiode 126, for example, functioning as a first holder, storage capacitive element 127, for example, functioning as a second holder, overflow transistor 128, discharge transistor 129, first transfer transistor 130, and second transfer transistor 131.

For example, each of transistors 121 through 125 and 128 through 131 may be an N channel MOS transistor. Note that an N channel MOS transistor (Nch transistor) turns on when the gate potential is high-level and turns off when the gate potential is low-level. A P channel MOS transistor (Pch transistor) turns on when the gate potential is low-level and turns off when the gate potential is high-level.

Transfer transistor 121 is connected between the cathode electrode of first photodiode 120 and floating diffusion (FD1) part 132. Transfer control line TGL is connected to the gate electrode of transfer transistor 121. Transfer transistor 121 turns on when a high-level transfer pulse φTGL from transfer control line TGL is applied to the gate electrode of transfer transistor 121, whereby the signal charge (specifically, electrons) photoelectric converted by and accumulated in first photodiode 120 is transferred to FD1 part 132.

Overflow transistor 128 is connected between the cathode electrode of first photodiode 120 and the cathode electrode of second photodiode 126. Overflow transistor control line OFG is connected to the gate electrode of overflow transistor 128. By controlling the potential of the channel part of overflow transistor 128 in response to a DC bias being applied to the gate electrode of overflow transistor 128 from overflow transistor control line OFG, when the signal charge generated by photoelectric conversion from first photodiode 120 exceeds the storage capacity of first photodiode 120, it is transferred to second photodiode 126 via overflow transistor 128. Note that a corrective circuit may be provided that corrects variances by changing the DC bias value of overflow transistor control line OFG when the potential of overflow transistor 128 differs due to difference in temperatures or variances between chips. Although in this example the transfer of charge from first photodiode 120 to second photodiode 126 is controlled by overflow transistor 128, overflow transistor 128 may be omitted and the transfer of the charge may be controlled using the impurity profile in the semiconductor substrate.

Discharge transistor 129 is connected between the cathode electrode of second photodiode 126 and pixel power supply line VDDC. Control line OFD is connected to the gate electrode of discharge transistor 129. Discharge transistor 129 turns on when a high-level discharge pulse φOFD from control line OFD is applied to the gate electrode of discharge transistor 129, whereby the signal charge (specifically, electrons) accumulated in second photodiode 126 is discharged to pixel power supply line VDDC.

First transfer transistor 130 is connected between the cathode electrode of second photodiode 126 and storage capacitive element 127. Transfer control line TGS1 is connected to the gate electrode of first transfer transistor 130. First transfer transistor 130 turns on when a high-level transfer pulse φTGS1 from transfer control line TGS1 is applied to the gate electrode of first transfer transistor 130, whereby the signal charge (specifically, electrons) accumulated in second photodiode 126 is transferred to storage capacitive element 127. This transfers the signal charge of second photodiode 126 completely to storage capacitive element 127—the signal charge is not distributed to second photodiode 126 and storage capacitive element 127.

Capacitance control line PVDD is connected to the other electrode of storage capacitive element 127. Capacitance control line PVDD may be supplied with a DC bias value. For example, since voltage at the time of reset of storage capacitive element 127 is AVDD when the DC bias value is ½ of AVDD, the voltage across storage capacitive element 127 is ½ the AVDD value. When irradiated with high-illuminance light, a large signal charge is transferred and the potential decreases, whereby the potential of storage capacitive element 127 increases to around 0 V. The voltage across storage capacitive element 127 at this time is ½ of AVDD. In other words, during signal accumulation after reset, the maximum absolute value of the voltage across storage capacitive element 127 is AVDD/2. On the other hand, when the DC bias supplied to capacitance control line PVDD is AVDD, during signal accumulation after reset, the maximum absolute value of the voltage across storage capacitive element 127 is AVDD. With this, from the viewpoint of ensuring reliability, in order to reduce the absolute value of the voltage across storage capacitive element 127, it is effective to supply ½ of AVDD as the DC bias to be supplied to capacitance control line PVDD.

Second transfer transistor 131 is connected to storage capacitive element 127 and FD2 part 133, which is between switching transistor 122 and reset transistor 123. Transfer control line TGC1 is connected to the gate electrode of second transfer transistor 131. Second transfer transistor 131 turns on when a high-level transfer pulse φTGC1 from transfer control line TGC1 is applied to the gate electrode of second transfer transistor 131, whereby the signal charge (specifically, electrons) accumulated in storage capacitive element 127 is transferred to FD2 part 133.

Switching control line SW1 is connected to the gate, FD2 part 133 is connected to the drain electrode, and FD1 part 132 is connected to the source electrode of switching transistor 122.

Reset control line RS is connected to the gate, pixel power supply line VDDC is connected to the drain electrode, and FD2 part 133 is connected to the source electrode of reset transistor 123. Before the signal charge is transferred from first photodiode 120 to FD1 part 132, reset transistor 123 turns on when a high-level reset pulse φRS from reset control line RS is applied to the gate electrode of reset transistor 123, and switching transistor 122 turns on when a high-level switching pulse φSW from switching control line SW1 is applied to the gate electrode of switching transistor 122, whereby the potentials of FD1 part 132 and FD2 part 133 are reset to power supply voltage AVDD.

The gate electrode of amplification transistor 124 is connected to FD1 part 132, the drain electrode is connected to pixel power supply line VDDC, and the source electrode is connected to the drain electrode of selection transistor 125.

The gate electrode of selection transistor 125 is connected to selection control line SEL, the drain electrode is connected to the source electrode of amplification transistor 124, and the source electrode is connected to vertical signal line PIXOUT. When a readout row is selected, selection transistor 125 turns on in response to application of a high-level selection pulse φSEL from selection control line SEL, and connects the source electrode of amplification transistor 124 and vertical signal line PIXOUT.

Via selection transistor 125 that has turned on, amplification transistor 124 outputs, to vertical signal line PIXOUT as a reset level, the potential of FD1 part 132 after it is reset by switching transistor 122 and reset transistor 123, and further outputs, to vertical signal line PIXOUT as a signal level, the potential of FD1 part 132 after the signal charge has been transferred by transfer transistor 121.

Here, conversion efficiency η of the conversion of signal charge into voltage is expressed as η=q/C, where q is elementary charge amount and C is the capacitance value of the floating diffusion part. Since conversion efficiency η is determined by capacitance value C, since FD1 part 132 and FD2 part 133 are connected to the gate part of amplification transistor 124 when switching transistor 122 is on, compared to when only FD1 part 132 is connected to the gate part of amplification transistor 124 when switching transistor 122 is off, conversion efficiency η decreases.

Here, the higher conversion efficiency η is, the more efficiently signal charge amount can be converted into voltage, whereby the voltage value of the output signal can be increased. Accordingly, the S/N ratio of pixel signal S to noise component N generated at column readout circuit 105 connected to vertical signal line PIXOUT can be increased, making it possible to achieve a high quality image.

Regarding the readout of storage capacitive element 127, when the signal charge of storage capacitive element 127 is transferred to FD1 part 132 upon second transfer transistor 131 turning on, the signal charge is not completely transferred to FD1 part 132, but rather moves to FD2 part 133 and FD1 part 132 via charge distribution. The potential of FD1 part 132 after second transfer transistor 131 turns on is output to vertical signal line PIXOUT as the signal level of storage capacitive element 127, and then FD1 part 132 is reset to AVDD by reset transistor 123. kTC noise is generated upon reset transistor 123 turning off. Since the potential of the reset FD1 part 132 is output to vertical signal line PIXOUT as a reset level and the output signal of the signal charge accumulated in storage capacitive element 127 from the difference between the signal level and the reset level is read out, the output signal includes kTC noise. Here, a wide dynamic range is achieved by using the output signal from first photodiode 120 for low-illuminance area image generation and using the output signal from storage capacitive element 127 for high-illuminance area image generation. Accordingly, regarding the output signal from storage capacitive element 127, since the signal charge is accumulated for some time, the effect that kTC noise generated in this case has on image quality is minor.

With pixel cell 101 illustrated in FIG. 2, a wide dynamic range can be achieved by using the output signal from first photodiode 120 for image generation corresponding to low illuminance and using the output signal from second holder 127 for image generation corresponding to high illuminance. Moreover, due to the provision of the first holder, photodiode 120 is suitable for long exposures (for example, continuous exposure or intermittent exposure). Accordingly, flicker can be easily mitigated. Moreover, since the first holder is implemented as second photodiode 126 rather than a capacitor, the signal charge can be completely transferred from photodiode 126 to second holder 127, without being divided or distributed. The first holder, i.e., second photodiode 126 may have the same configuration as first photodiode 120, and thus can be manufactured easily.

Although selection transistor 125 is provided in this example, selection transistor 125 may be omitted. It is possible to select a row of pixel cells 101 by increasing the potential of FD1 parts 132 in pixel cells 101 in the row to be selected and decreasing the potential of FD1 parts 132 in rows not to be selected to activate amplification transistors 124 in the row to be selected and output to vertical signal lines PIXOUT.

Figure 3A:
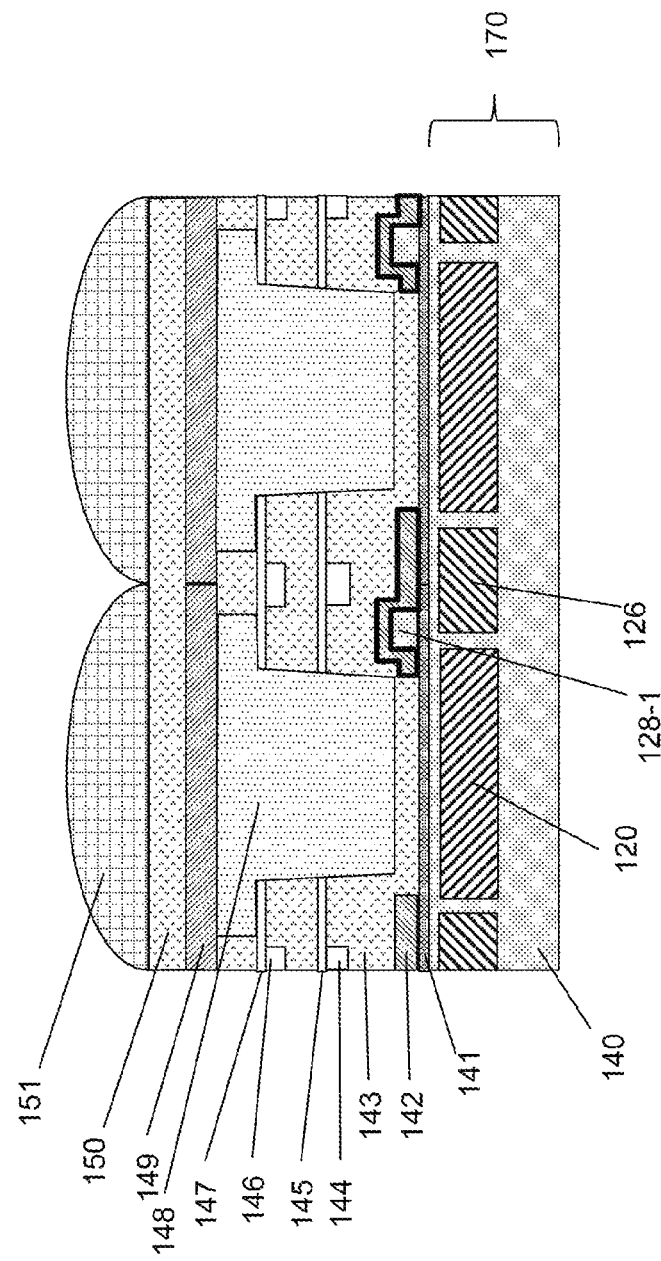
FIG. 3A illustrates a schematic cross section of a first example of a pixel included in the solid-state imaging apparatus according to Embodiment 1.

FIG. 3A through FIG. 3D illustrate schematic cross sections of first through fourth examples of pixel cell configurations in the solid-state imaging apparatus according to Embodiment 1. FIG. 3A illustrates a schematic cross section of a front side illumination pixel cell 101 that includes: well region 140 including a p-type impurity in semiconductor substrate 170; first photodiode 120 including an n-type impurity different than the p-type impurity in semiconductor substrate 170; second photodiode 126 including an n-type impurity and functioning as a first holder in semiconductor substrate 170; gate insulating film 141; overflow transistor gate 128-1; light-shielding line 142; insulating film 143; copper line 144; liner film 145; copper line 146; liner film 147; high-refraction insulating film 148; color filter 149; transmissive filter 150 functioning as a planarizing film; and microlens 151. First photodiode 120 and second photodiode 126 are formed as buried diodes.

In this example, first photodiode 120 that accumulates a charge is provided per pixel in the capturing region functioning as the light-receiving surface in semiconductor substrate 170, and furthermore, overflow transistor gate 128-1, which is one example of a gate, is formed adjacent to first photodiode 120, above semiconductor substrate 170.

In semiconductor substrate 170 described above, when the signal charge generated by photoelectric conversion by first photodiode 120 and accumulated in first photodiode 120 exceeds the storage capacity of first photodiode 120, it is transferred to the adjacent second photodiode 126 via overflow transistor 128. A light-shielding line is formed above this second photodiode 126 which prevents light from being received from above. With this, since photoelectric conversion is performed mainly in first photodiode 120, the photoelectric conversion efficiency of the signal charges accumulated in first photodiode 120 and second photodiode 126 relative to the light incident on pixel cell 101 are approximately the same, which makes it possible to perform adding processing that adds these two signal charges together in a downstream signal processing circuit 107.

Moreover, using second photodiode 126 as the first holder enables first transfer transistor 130 to completely transfer the signal charge of second photodiode 126 to storage capacitive element 127. Using second photodiode 126 as the first holder additionally enables discharge transistor 129 to completely discharge the signal charge of second photodiode 126. Accordingly, the accumulation period of the signal charge of second photodiode 126 can be controlled by controlling the period in which discharge pulse φOFD of discharge transistor 129 is changed from high to low and subsequently transfer pulse φTGS1 of first transfer transistor 130 is changed from low to high, making it possible to discretionarily control photoelectric conversion efficiency. Using signal processing circuit 107, the exposure period of first photodiode 120, and the accumulation period of second photodiode 126 makes it possible to perform processing for calculation and adding on the signal charge accumulated in first photodiode 120 and the signal charge accumulated in storage capacitive element 127 via second photodiode 126.

Figure 3B:
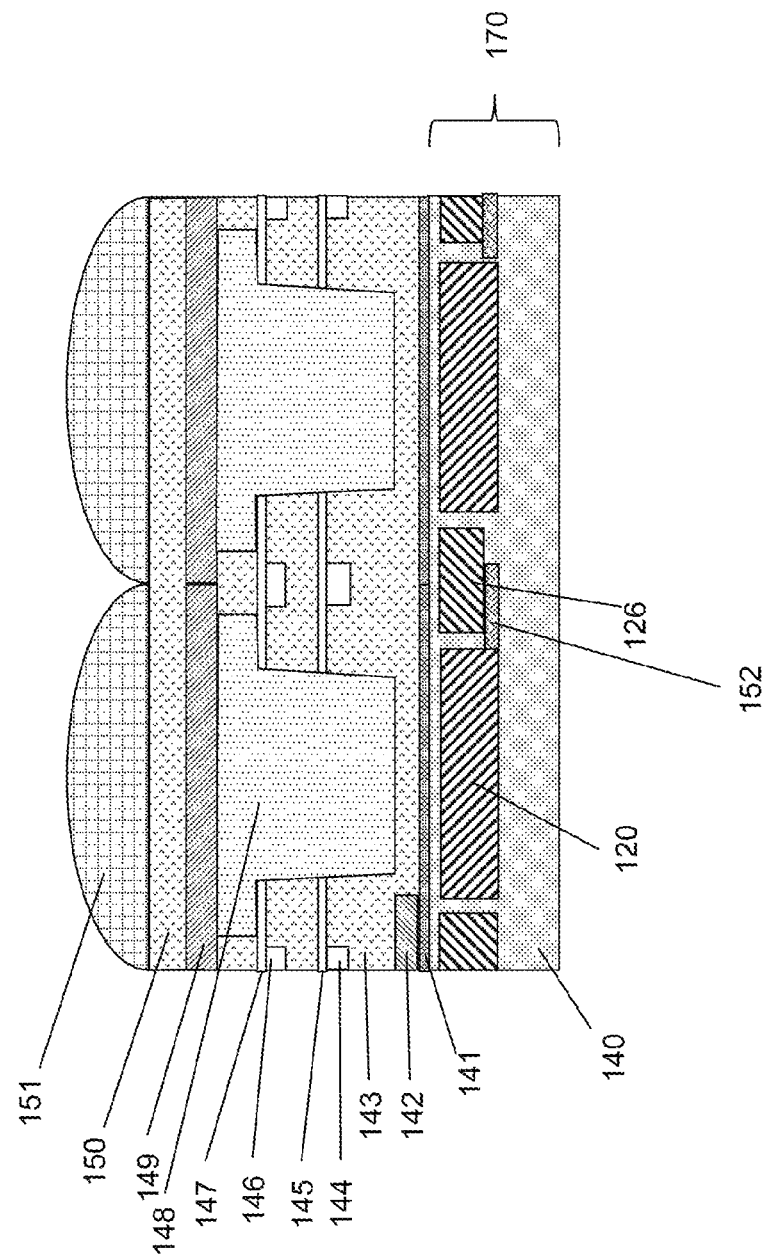
FIG. 3B illustrates a schematic cross section of a second example of a pixel included in the solid-state imaging apparatus according to Embodiment 1.

FIG. 3B illustrates a schematic cross section of a front side illumination pixel cell 101. The front side illumination pixel cell 101 illustrated in FIG. 3B differs from the front side illumination pixel cell 101 illustrated in FIG. 3A in that overflow transistor gate 128-1 is omitted and diffusion region 152 including a p-type impurity is provided as a transfer channel below second photodiode 126 and abutting a side surface of first photodiode 120. When the signal charge generated by first photodiode 120 exceeds the storage capacity of first photodiode 120, first photodiode 120 and second photodiode 126 become electrically connected via diffusion region 152, the signal charge generated in first photodiode 120 enters diffusion region 152, and is then accumulated in second photodiode 126. In other words, diffusion region 152 functions as a transfer channel that guides the signal charge that overflows from first photodiode 120 to second photodiode 126. Note that the above operation is possible by making the concentration of the p-type impurity in diffusion region 152 lower than the concentration of the p-type impurity in the separated part located between first photodiode 120 and second photodiode 126.

Figure 3C:
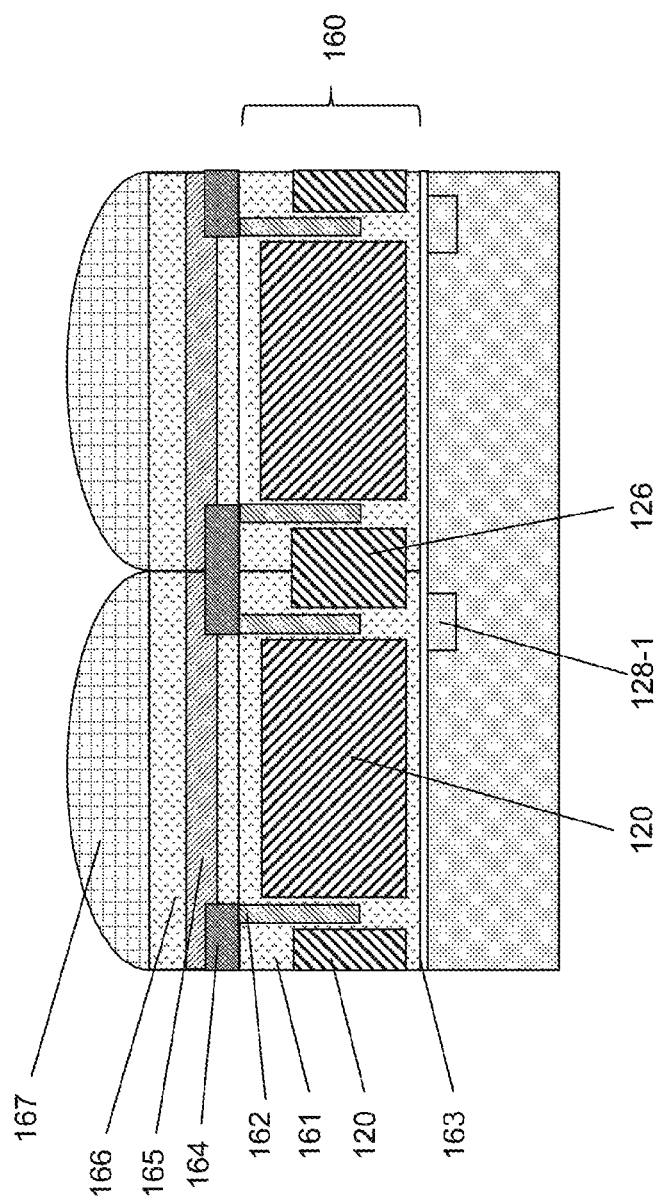
FIG. 3C illustrates a schematic cross section of a third example of a pixel included in the solid-state imaging apparatus according to Embodiment 1.

FIG. 3C illustrates a schematic cross section of a back side illumination pixel cell 101 and includes: well region 161 including a p-type impurity in semiconductor substrate 160; first photodiode 120 including an n-type impurity different than the p-type impurity in semiconductor substrate 160; second photodiode 126 including an n-type impurity that functions as a first holder in semiconductor substrate 160; light-shielding wall 162 in semiconductor substrate 160; gate insulating film 163 in semiconductor substrate 160; overflow transistor gate 128-1; insulating film 143; light-shielding film 164; color filter 165; transmissive filter 166 functioning as a planarizing film; and microlens 167. In this example, the side of semiconductor substrate 160 on which microlens 167 is provided is defined as the back side, and the side of semiconductor substrate 160 on which overflow transistor gate 128-1 is provided is defined as the front side.

Accordingly, the back side illumination pixel cell 101 illustrated in FIG. 3C differs from the front side illumination pixel cell 101 illustrated in FIG. 3A in that microlens 167 is formed on the back side of semiconductor substrate 160, and that light is incident on the back side of semiconductor substrate 160, received by first photodiode 120, and photoelectric converted. Light-shielding film 164 is formed on the back side of second photodiode 126 functioning as the first holder, and light-shielding wall 162 is formed between first photodiode 120 and second photodiode 126. This gives the back side illumination pixel cell 101 a structure that blocks light from the back side. For example, light-shielding wall 162 may be formed by deep trench isolation (DTI), and incident light may be completely reflected to inhibit color mixing by using SiO or air as the internal material, which has a higher refractive index than Si, which is one example of the material of semiconductor substrate 160. A method whereby metal material is buried to reflect light may be used. Light-shielding film 164 may be made using, for example, tungsten (W).

Figure 3D:
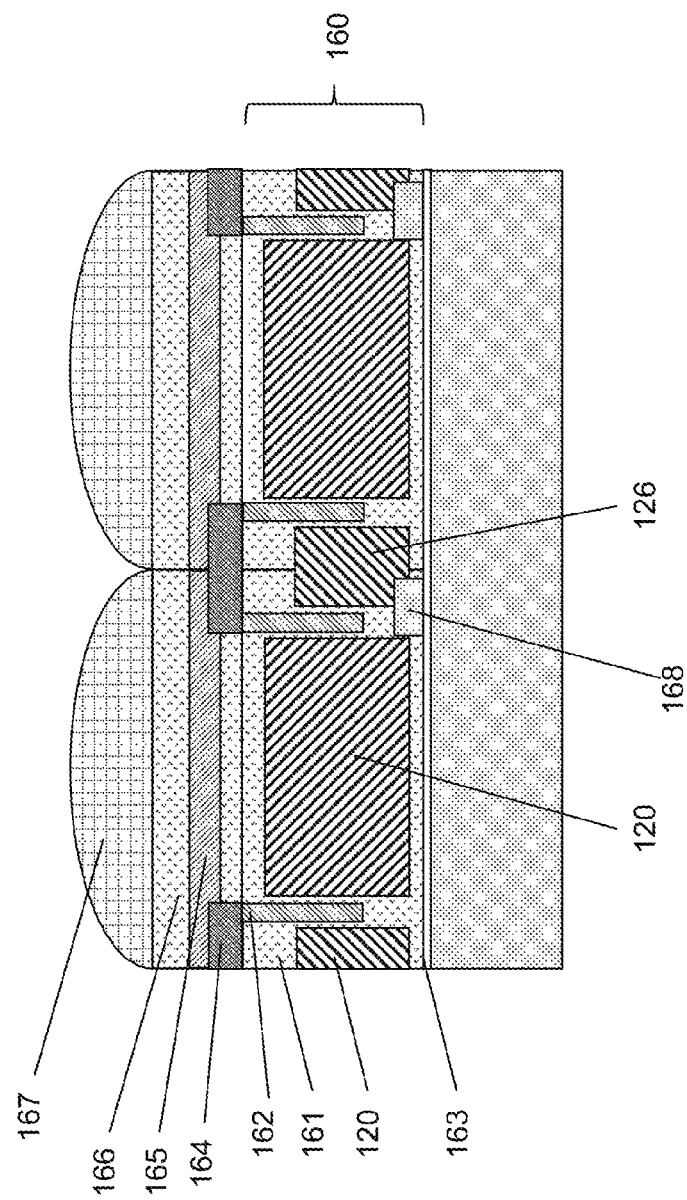
FIG. 3D illustrates a schematic cross section of a fourth example of a pixel included in the solid-state imaging apparatus according to Embodiment 1.

FIG. 3D illustrates a schematic cross section of a back side illumination pixel cell 101. The back side illumination pixel cell 101 illustrated in FIG. 3D differs from the back side illumination pixel cell 101 illustrated in FIG. 3C in that overflow transistor gate 128-1 is omitted and diffusion region 168 including a p-type impurity is provided as a transfer channel below (on the front side of) second photodiode 126 and abutting a side surface of first photodiode 120. When the signal charge generated by first photodiode 120 exceeds the storage capacity of first photodiode 120, first photodiode 120 and second photodiode 126 become electrically connected via diffusion region 168, the signal charge generated in first photodiode 120 enters diffusion region 168, and is then accumulated in second photodiode 126. In other words, diffusion region 168 functions as a transfer channel that guides the signal charge that overflows from first photodiode 120 to second photodiode 126. Note that the above operation is possible by making the concentration of the n-type impurity in diffusion region 168 lower than the concentration of the p-type impurity in the separated part located between first photodiode 120 and second photodiode 126.

In FIG. 3B and FIG. 3D described above, impurity diffusion region 152 or 168, which functions as a transfer channel that guides the signal charge that overflows from first photodiode 120 to second photodiode 126, is provided on the non-incident surface side of second photodiode 126. Here, the non-incident surface and the incident surface are on opposite sides of the solid-state imaging apparatus. In other words, in the solid-state imaging apparatus, the surface on which light is incident is referred to as an incident surface, and the surface on the opposite side of the incident surface is referred to as a non-incident surface. In FIG. 3A through FIG. 3D, the side on which the microlens 151 is not formed is the non-incident surface side.

Note that in FIG. 3B, second photodiode 126 (the first holder) may include a first semiconductor region of a first conductivity type that holds a signal charge and a second semiconductor region of a second conductivity type arranged above the first semiconductor region. First photodiode 120 may further include a third semiconductor region of the first conductivity type that holds a signal charge. In first photodiode 120, the first semiconductor region may be arranged above the third semiconductor region, and diffusion region 152 may be arranged between the third semiconductor region and the first semiconductor region as a fourth semiconductor region of the second conductivity type.

Figure 4:
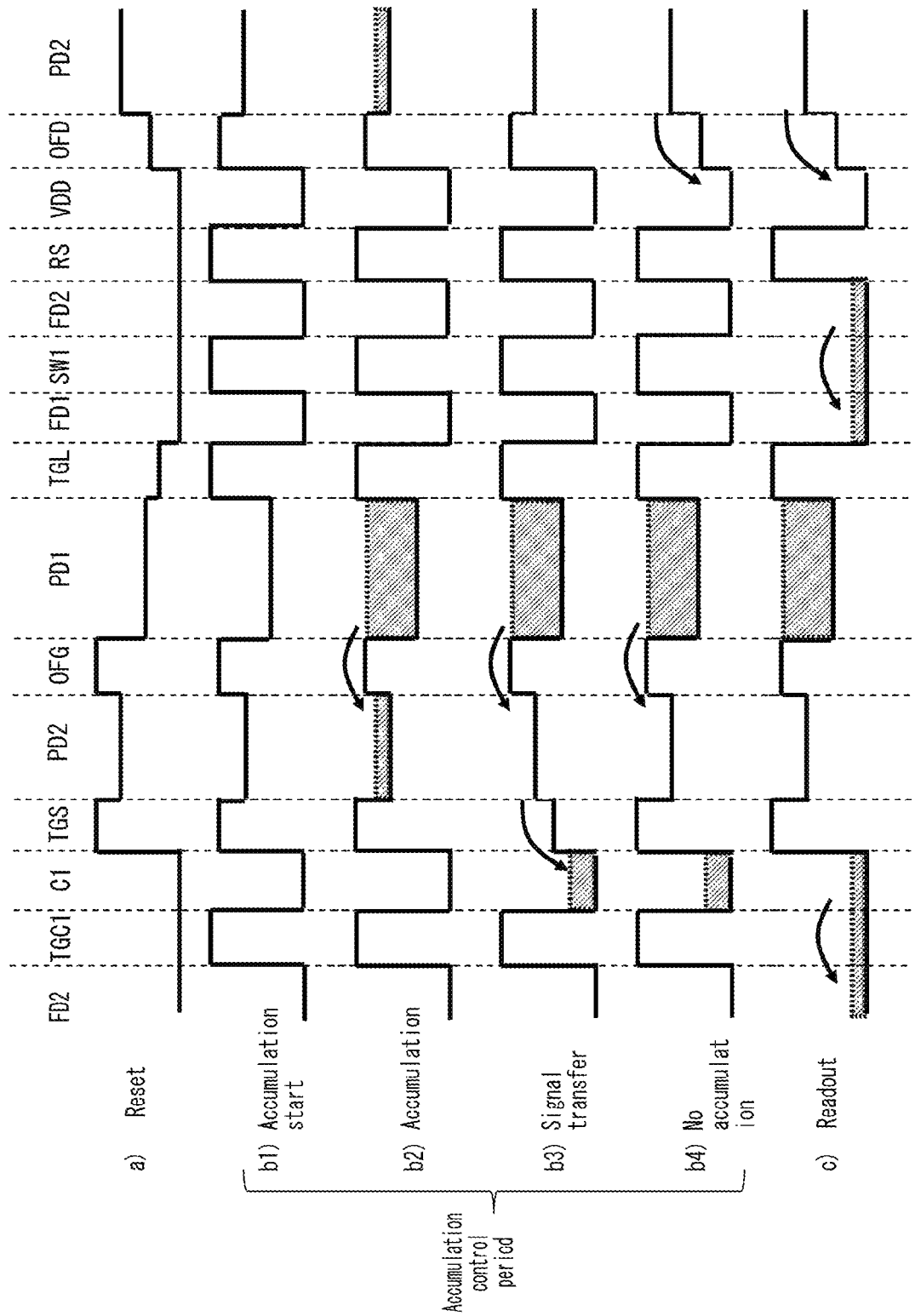
FIG. 4 illustrates potential in the semiconductor substrate of a pixel included in the solid-state imaging apparatus according to Embodiment 1.

FIG. 4 illustrates potential in the semiconductor substrate of a pixel included in the solid-state imaging apparatus according to Embodiment 1. Relative locations in the semiconductor substrate are represented on the vertical axis. Potential increases downward along the vertical axis.

In FIG. 4, potential in pixel cell 101 at FD2 part 133, in semiconductor substrate 170 below transfer transistor gate 131-1, at capacitive element node (C1) 127-1, in semiconductor substrate 170 below transfer transistor gate 130-1, at second photodiode 126, in semiconductor substrate 170 below overflow transistor gate 128-1, at first photodiode 120, in semiconductor substrate 170 below transfer transistor gate 121-1, at FD1 part 132, below switching transistor gate 122-1, at FD2 part 133, below reset transistor gate 123-1, at power supply line part VDDC, and below discharge transistor gate 129-1. In order to clarify the location of the elements in FIG. 4, the names of the control lines and the names of the nodes are used for the reference signs of the elements.

In FIG. 4, a) indicates the reset operation. A high-level reset pulse φRS is applied to reset transistor gate 123-1 from reset control line RS; a high-level switching pulse φSW1 is applied to switching transistor gate 122-1 from switching control line SW1; a high-level reset pulse φTGL is applied to transfer transistor gate 121-1 from transfer control line TGL; a high-level reset pulse φTGC1 is applied to transfer transistor gate 131-1 from transfer control line TGC1; FD1 part 132, FD2 part 133, and capacitive element node (C1) 127-1 are reset to power supply voltage AVDD; and the signal charges from first photodiode 120 and second photodiode 126 are completely transferred and reset.

In FIG. 4, b1) indicates potential at start of the exposure in the accumulation control period. A low-level reset pulse φRS is applied to reset transistor gate 123-1 from reset control line RS; a low-level switching pulse φSW1 is applied to switching transistor gate 122-1 from switching control line SW1; a low-level transfer pulse φTGL is applied to transfer transistor gate 121-1 from transfer control line TGL; a low-level transfer pulse φTGS1 is applied to transfer transistor gate 131-1 from transfer control line TGS1; and first photodiode 120, second photodiode 126, and storage capacitive element 127 are placed in a state in which they can accumulate a signal charge.

In FIG. 4, b2) indicates potential during the accumulation of the signal charge in the accumulation control period. First photodiode 120 converts light into an amount of electricity dependent on the amount of incident light, and accumulates a signal charge. The potential barrier in semiconductor substrate 170 below overflow transistor gate 128-1 adjacent to first photodiode 120 is made to be lower than the potential barrier in semiconductor substrate 170 below transfer transistor gate 121-1 also adjacent to first photodiode 120 via the DC bias supplied from overflow transistor control line OFG. With this, when the signal charge accumulated in first photodiode 120 exceeds the storage capacity of first photodiode 120, the signal charge is transferred to second photodiode 126 via semiconductor substrate 170 below overflow transistor gate 128-1 and accumulated in second photodiode 126.

In FIG. 4, b3) indicates potential in the accumulation control period when the signal charge accumulated in second photodiode 126 is transferred to storage capacitive node (C1) 127-1. A high-level transfer pulse φTGS1 is applied to transfer transistor gate 130-1 from transfer control line TGS1, and the signal charge accumulated in second photodiode 126 is completely transferred from second photodiode 126 to storage capacitive node (C1) 127-1.

In FIG. 4, b4) indicates potential in the accumulation control period when the signal charge accumulated in second photodiode 126 is discharged. A low-level transfer pulse φTGS1 is applied to transfer transistor gate 130-1 from transfer control line TGS1, and the transfer of the signal charge from second photodiode 126 to storage capacitive node (C1) 127 is stopped. A high-level discharge pulse φOFD is applied to discharge transistor gate 129-1 from discharge control line OFD, and the signal charge is discharged from second photodiode 126 to power supply line VDDC. In this period, since signal charge that overflows from first photodiode 120 to second photodiode 126 is reset to the power supply voltage, it is not accumulated in second photodiode 126. In other words, second photodiode 126 is in a non-exposed state.

When, among the accumulation time of second photodiode 126, the period from b1) accumulation start to b3) transfer to capacitor is defined as Texp, when this accumulation control period is repeated N times, it is expressed as Texp×N.

In FIG. 4, c) indicates potential upon transfer of the signal charge of storage capacitive element 127 to floating diffusion part 132. A high-level transfer pulse φTGC1 is applied to transfer transistor gate 131-1 from transfer control line TGC1, the signal charge accumulated in storage capacitive element 127 is transferred from storage capacitive element 127 to FD2 part 133, a high-level switching pulse φSW1 is applied to switching transistor gate 122-1 from switching control line SW1, FD2 part 133 and FD1 part 132 become connected, and the signal charge accumulated in storage capacitive node (C1) 127 is transferred to FD1 part 132 and FD2 part 133.

Figure 5:
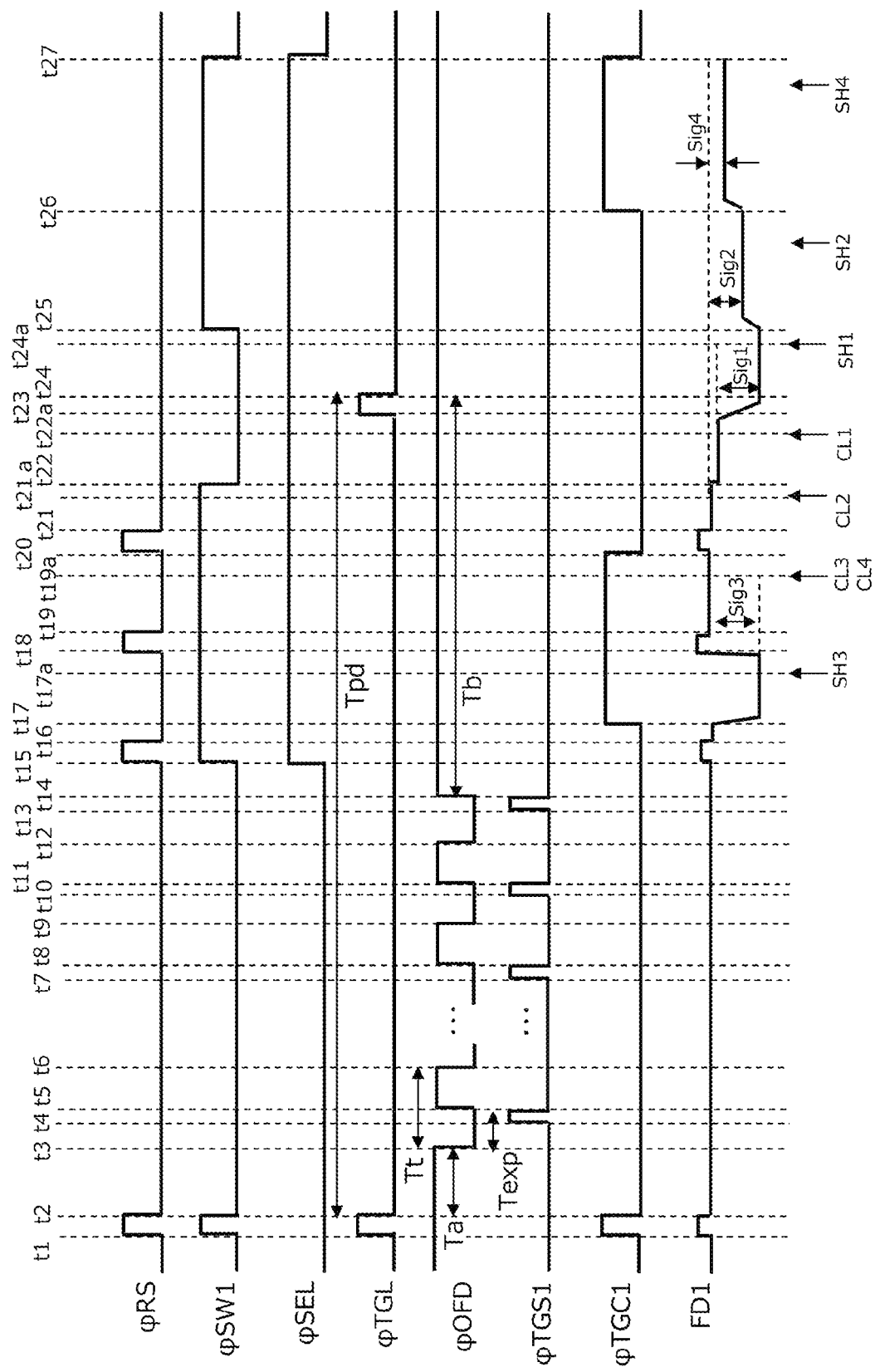
FIG. 5 illustrates a first example of a timing chart for explaining operations of a pixel included in the solid-state imaging apparatus according to Embodiment 1.

FIG. 5 illustrates one example of a timing chart for explaining operations performed by the pixel illustrated in FIG. 2.

At time t1, φRS and φSW1 become high-level pulses, whereby power supply voltage AVDD is applied to FD2 part 133 and FD1 part 132. Moreover, φTGL becomes a high-level pulse, whereby the signal charge of first photodiode 120 is discharged. φOFD is also a high-level pulse, so the signal charge of second photodiode 126 is also discharged. φTGC1 becomes a high-level pulse, whereby power supply voltage AVDD is applied to storage capacitive element 127.

At time t2, φRS and φSW1 become low-level pulses. Here, a step in the potential of FD1 part 132 is typically formed due to noise from the switching of reset transistor 123 and switching transistor 122. Moreover, φTGL and φTGC1 become low-level pulses, whereby signal charge can be accumulated.

At time t3, φOFD becomes a low-level pulse, whereby the signal charge of second photodiode 126 can be accumulated. This is the driving timing corresponding to the potential at "accumulation start" indicated by b1) in FIG. 4.

At time t4, φTGS1 becomes a high-level pulse, whereby the signal charge is transferred from second photodiode 126 to storage capacitive element 127. This is the driving timing corresponding to the potential at "signal transfer" indicated by b3) in FIG. 4.

At time t5, φTGS1 becomes a low-level pulse, whereby the transfer of the signal charge from second photodiode 126 to storage capacitive element 127 is completed. Moreover, φOFD becomes a high-level pulse, whereby the signal charge of second photodiode 126 is discharged to the power source. This is the driving timing corresponding to the potential at "no accumulation" indicated by b4) in FIG. 4, and period Texp from time t3 to time t5 is equivalent to the accumulation period of storage capacitive element 127.

At time t6, φOFD becomes a low-level pulse, whereby the signal charge of second photodiode 126 can be accumulated once again.

The pulses of φOFD and φTGS1 repeat until time t14, as accumulation cycle Tt from time t3 to time t6.

At time t15, φRS and φSW1 become high-level pulses, whereby power supply voltage AVDD is applied to FD2 part 133 and FD1 part 132. φSEL becomes a high-level pulse, whereby selection transistor 125 turns on and the source electrode of amplification transistor 124 and vertical signal line PIXOUT become electrically connected. A constant current flows through amplification transistor 124, forming a source follower. Although not illustrated in this figure, a low-level φSEL pulse is supplied to gate electrodes of selection transistors 125 in other pixels connected to the same vertical signal line PIXOUT, which turns the selection transistors 125 off.

At time t16, φRS and φSW1 become low-level pulses. Here, a step in the potential of the FD1 part is typically formed due to noise from the switching of reset transistor 123 and switching transistor 122.

At time t17, φTGC1 becomes a high-level pulse. Here, the signal charge held in storage capacitive element 127 is distributed to FD2 part 133 and FD1 part 132, the potential of FD1 part 132 decreases, and at time t17a when the potential stabilizes, the signal level (SH3) is sampled.

At time t18, φRS becomes a high-level pulse, whereby power supply voltage AVDD is applied to FD2 part 133, FD1 part 132, and storage capacitive element 127.

At time t19, φRS becomes a low-level pulse. Here, at time t19a when the potential of FD1 part 132 stabilizes, the signal level (CL3, CL4) is sampled. In column readout circuit 105, output signal Sig3 of storage capacitive element 127 is extracted from the difference between the signal level (SH3) at time t17a and the signal level (CL3) at time t19a.

At time t20, φTGC1 becomes a low-level pulse whereby second transfer transistor 131 turns off, and φRS becomes a high-level pulse whereby power supply voltage AVDD is applied to FD2 part 133 and FD1 part 132.

At time t21, φRS becomes a low-level pulse. Here, at time t21a when the potential of FD1 part 132 stabilizes, the signal level (CL2) is sampled.

At time t22, φSW1 becomes a low-level pulse. Here, at time t22a when the potential of FD1 part 132 stabilizes, the signal level (CL1) is sampled.

At time t23, φTGL becomes a high-level pulse. Here, the signal charge is transferred from first photodiode 120 to FD1 part 132, whereby the potential of FD1 part 132 decreases.

At time t24, φTGL becomes a low-level pulse, whereby the transfer of the signal charge from first photodiode 120 to FD1 part 132 is completed.

At time t24a, the potential of FD1 part 132 stabilizes, and the signal level (SH1) is sampled. In column readout circuit 105, output signal Sig1 of first photodiode 120 is extracted from the difference between the signal level (CL1) at time t22a and the signal level (SH1) at time t24a.

At time t25, φSW1 becomes a high-level pulse. Here, in addition to FD1 part 132, capacitance increases by the parasitic capacitance of switching transistor 122 and FD2 part 133, so compared to at time t24, conversion efficiency η decreases and the potential of FD1 part 132 increases. At time t25a when the potential of FD1 part 132 stabilizes, the signal level (SH2) is sampled. In column readout circuit 105, output signal Sig2 of first photodiode 120 is extracted from the difference between the signal level (CL2) at time t21a and the signal level (SH2) at time t25a.

At time t26, φTGC1 becomes a high-level pulse. Here, in addition to the capacitances of FD1 part 132, switching transistor 122, and FD2 part 133, since the capacitance of second transfer transistor 131 and the capacitance of storage capacitive element 127 increase, compared to at time t25, conversion efficiency η decreases and the potential of FD1 part 132 increases. At time t26a when the potential of FD1 part 132 stabilizes, the signal level (SH4) is sampled. In column readout circuit 105, output signal Sig4 of first photodiode 120 is extracted from the difference between the signal level (CL4) at time t19a and the signal level (SH4) at time t26a.

At time t27, φSW1 and φTGC1 become low-level pulses. φSEL becomes a low-level pulse, whereby selection transistor 125 turns off and the source electrode of amplification transistor 124 and vertical signal line PIXOUT become electrically disconnected.

Exposure period Tpd of first photodiode 120 is the period from time t2 at which φTGL becomes a low-level pulse to time t24. On the other hand, accumulation period Tc1 of storage capacitive element 127 in which the signal charge is transferred from second photodiode 126 is expressed as shown in Equation 1, where Ta is defined as the period from time t2 to time t3, Tb is defined as the period from time t14 to time t24, and Tt is defined as an accumulation cycle.

$$Tc1 = (Tpd - Ta - Tb) \times Texp/Tt \qquad \text{Equation 1:}$$

It is therefore possible to calculate the ratio between exposure period Tpd of first photodiode 120 and accumulation period Tc1 of storage capacitive element 127 by using Equation 1 expressing exposure period Tpd and accumulation period Tc1.

If the above timing chart is followed, a total of four output signals in different states can be obtained. Output signal Sig1 resulting from turning switching transistor 122 off and converting the signal charge of first photodiode 120 into voltage at a higher conversion efficiency, output signal Sig2 resulting from turning switching transistor 122 on and converting the signal charge of first photodiode 120 into voltage, and output signal Sig4 resulting from turning switching transistor 122 on and turning second transfer transistor 131 on and converting the signal charge of first photodiode 120 into voltage can be obtained. Moreover, output signal Sig3 resulting from converting the signal charge transferred from second photodiode 126 and accumulated in storage capacitive element 127 into voltage can be obtained.

Figure 6:
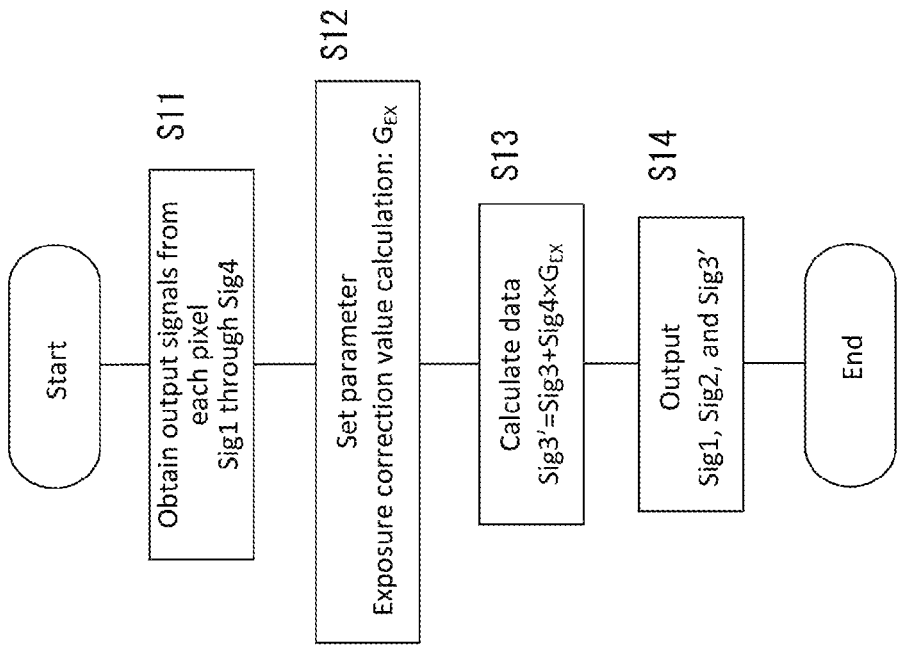
FIG. 6 illustrates a flowchart of signal processing for pixels included in the solid-state imaging apparatus according to Embodiment 1.

FIG. 6 illustrates a flowchart of signal processing for pixels included in the solid-state imaging apparatus according to Embodiment 1. First, as shown in the timing chart in FIG. 5, the output signals of the pixels (Sig1 through Sig4) are obtained (S11). Next, exposure correction value $G_{EX}$ is calculated (S12). The exposure correction value corresponds to the proportion of accumulation period Tc1, in which the signal charge that overflows from first photodiode 120 to second photodiode 126 is transferred and accumulated, relative to exposure period Tpd of first photodiode 120 ($G_{EX}$=Tc1/Tpd). As is illustrated in the timing chart in FIG. 5, accumulation period Tc1 is mainly controlled by the pulse timing of φOFD and φTGS1. Next, data calculation is performed (S13). Data calculation involves performing calculation, for each pixel, using output signal Sig4 of the signal charge of first photodiode 120 and output signal Sig3 of the signal charge accumulated in storage capacitive element 127 in accordance with the equation Sig3'=Sig3+ Sig4×$G_{EX}$. This outputs Sig1 and Sig2, which are signal charges of first photodiode 120, and Sig3' resulting from processing for calculating the output signal of first photodiode 120 and the output signal of storage capacitive element 127 (S14). Sig1, Sig2, and Sig3' correspond to pixel signals characterized by subject illuminances ranging from low illuminance to high illuminance. Combining Sig1, Sig2, and Sig3' achieves a wider dynamic range.

Figure 7:
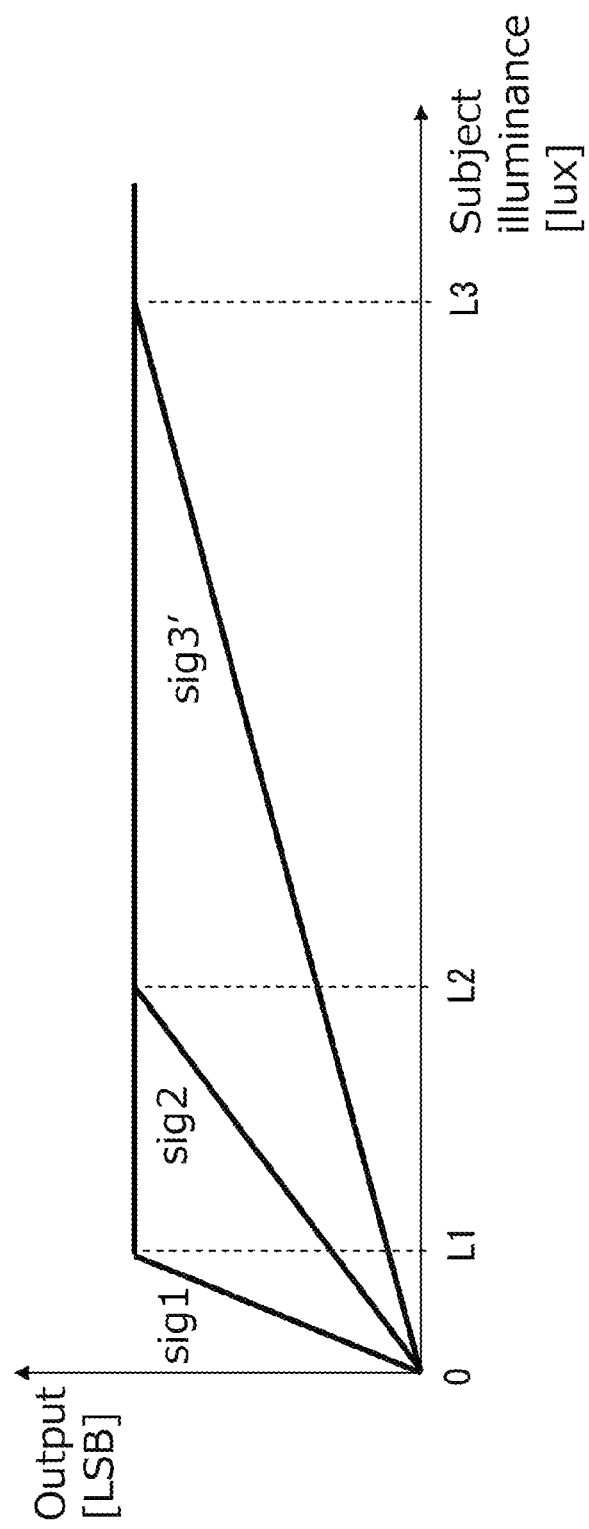
FIG. 7 is a graph illustrating the relationship between the subject illuminance of a pixel included in the solid-state imaging apparatus according to Embodiment 1 and the output signal of the pixel.

FIG. 7 is a graph illustrating the relationship between the subject illuminance of a pixel included in the solid-state imaging apparatus according to Embodiment 1 and the output signal of the pixel. Subject illuminance is represented on the horizontal axis, and output is represented on the vertical axis. FIG. 7 illustrates output signal Sig1 resulting from turning switching transistor 122 off and converting the signal charge of first photodiode 120 into voltage at a higher conversion efficiency, output signal Sig2 resulting from turning switching transistor 122 on and converting the signal charge of first photodiode 120 into voltage, and output signal Sig3' resulting from converting the signal charge transferred from second photodiode 126 and accumulated in storage capacitive element 127 into voltage and performing the processing for calculation. The inclines in the graph are dependent on conversion efficiency, gain settings at the time of AD conversion, the accumulation period, and the exposure period. Output signal Sig1, which covers low-illuminance subjects, has a steep incline since the conversion efficiency is high and the gain setting at the time of AD conversion is set higher than the others. Since the output shown is the output after AD conversion, the maximum value is dependent on the bits at the time of AD conversion.

The output value of Sig1 after AD conversion reaches its maximum value at subject illuminance L1 and stays constant regardless of the subject illuminance.

The output value of Sig2 after AD conversion reaches its maximum value at subject illuminance L2 and stays constant regardless of the subject illuminance. Since the conversion efficiency of FD1 part 132 is lower and the gain setting at the time of AD conversion is also set lower than Sig1, the output reaches its maximum value at subject illuminance L2 which is higher than subject luminance L1.

The output value of Sig3' after AD conversion reaches its maximum value at subject illuminance L3 and stays constant regardless of the subject illuminance.

The range of capturable subject illuminance of Sig3' is from 0 to L3, which is wider than Sig2, and even at relatively higher subject illuminances, an amount of signal charge in accordance with the subject illuminance can be obtained. This is because it is possible to accumulate in storage capacitive element 127 the signal charge that overflows from first photodiode 120 at a given accumulation time ratio. Moreover, the accumulation period can be shortened to achieve a gentler incline (a relatively reduced sensitivity) to enable the capturing of higher illuminance environments without increasing pixel size and increasing the capacitance value of storage capacitive element 127.

Here, in order to mitigate LED light source flicker, it is necessary for the solid-state imaging apparatus to implement continuous exposure or implement intermittent exposure characterized by a cycle of $T_{LED}/2$ or less, where $T_{LED}$ is the pulse cycle of the emission of light by the LED light source. Since output signals Sig1 and Sig2 are signal charges of first photodiode 120 obtained by continuous exposure, flicker is mitigated. Moreover, with Sig3', by implementing intermittent exposure, the accumulated charge amount of the signal charge increases with the use of storage capacitive element 127 and the signal charge is intermittently accumulated as a result of cyclically repeating the operations from time t3 to time t6 in FIG. 5, thereby making it possible to capture a high-illuminance subject and obtain images in which flicker from LED light sources is mitigated.

Figure 8:
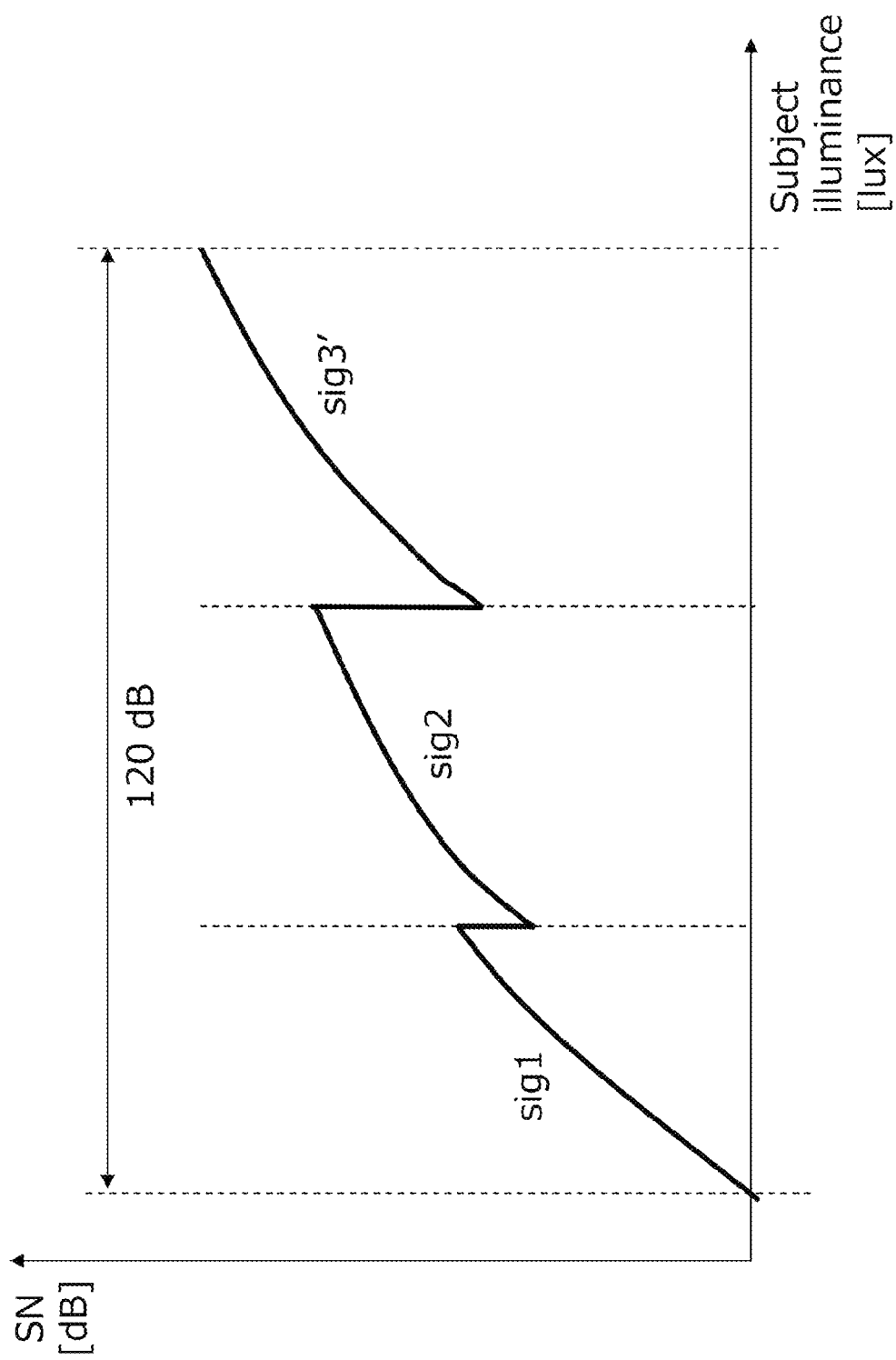
FIG. 8 is a graph illustrating the relationship between the subject illuminance of a pixel included in the solid-state imaging apparatus according to Embodiment 1 and the SN (signal to noise ratio) of the pixel.

FIG. 8 is a graph illustrating the relationship between the subject illuminance of a pixel included in the solid-state imaging apparatus according to Embodiment 1 and the SN (signal to noise ratio) of the pixel. Subject illuminance is represented on the horizontal axis, and SN is represented on the vertical axis. FIG. 8 shows that the output signals Sig1, Sig2, and Sig3' are combined to achieve a range of illuminances from a low illuminance to a high illuminance, and shows the SN of the combined image relative to subject illuminance. Combining the output signals makes it possible to both maintain a high SN and secure a wide dynamic range.

Here, the dynamic range (DR) can be easily calculated as shown below, using the saturation ratio of saturation Sat_cap of storage capacitive element 127 to saturation Sat_pd of first photodiode 120 (Sat_cap/Sat_pd), and the accumulation period ratio of accumulation period Tc1 in which the signal charge that overflows from first photodiode 120 to second photodiode 126 is transferred and accumulated, to exposure period Tpd of first photodiode 120 (Tc1/Tpd).

DR (of the WDR)=DR of 1 frame+saturation ratio (Sat_cap/Sat_pd)/accumulation period ratio (Tc1/Tpd)=72 dB (AD 12-bit)+48 dB (256/1 times)=120 dB Note that with regard to the DR of 1 frame, the DR (=saturation/noise ratio) of a pixel is limited by the precision of the AD bit width, assuming that the DR of the pixel exceeds the precision of exceeds the precision of the AD bit width.

Moreover, when storage capacitive element 127 is used, the output signal includes kTC noise, which worsens noise. Hypothetically, if a wide dynamic range image were to be obtained using only Sig3', the effects of kTC noise in the low illuminance region would be evident, degrading the image quality (S/N) to unacceptable levels in particular in the low illuminance regions in which S/N has a greater impact. However, according to Embodiment 1, since the low-illuminance image quality is determined by output signals Sig1 and Sig2 from first photodiode 120, the problem of the worsening of the low-illuminance image quality S/N is non-existent.

As described above, solid-state imaging apparatus 100 according to the present embodiment includes pixel cells 101 arranged in a matrix, each of pixel cells 101 including first photodiode 120 that accumulates a signal charge generated by photoelectric conversion; second photodiode 126 that functions as a first holder that holds a signal charge that overflows from first photodiode 120; second holder 127; and first transfer transistor 130 that transfers the signal charge held in the first holder (i.e., second photodiode 126) to second holder 127.

With this, a wide dynamic range can be achieved by using the output signal from first photodiode 120 for image generation corresponding to low illuminance and using the output signal from second holder 127 for image generation corresponding to high illuminance. Moreover, due to the provision of the first holder, photodiode 120 is suitable for long exposures (for example, continuous exposure or intermittent exposure). Accordingly, flicker can be easily mitigated. Moreover, since the first holder is implemented as second photodiode 126 rather than a capacitor, the signal charge can be completely transferred from photodiode 126 to second holder 127, without being divided or distributed. The first holder (second photodiode 126) has the same configuration as first photodiode 120, and thus can be manufactured easily.

Here, solid-state imaging apparatus 100 may further include: floating diffusion part 132 that holds a signal charge; and second transfer transistor 131 that transfers a signal charge from second holder 127 to floating diffusion part 132.

Here, solid-state imaging apparatus 100 may include switching transistor 122 between second transfer transistor 131 and floating diffusion part 132.

Here, second photodiode 126 may be a buried photodiode.

Here, solid-state imaging apparatus 100 may include an incident surface on which light is incident and a non-incident surface that are on opposite sides of solid-state imaging apparatus 100. Solid-state imaging apparatus 100 may further include, on the non-incident surface side of second photodiode 126, impurity diffusion region 152 or 168 as a transfer channel that guides the signal charge that overflows from first photodiode 120 to second photodiode 126.

Here, solid-state imaging apparatus 100 may further include overflow transistor 128 that guides the signal charge that overflows from first photodiode 120 to second photodiode 126.

Here, solid-state imaging apparatus 100 may further include a light-shielding film (for example, light-shielding line 142 or light-shielding wall 162) that shields second photodiode 126 from light.

Here, solid-state imaging apparatus 100 may further include: discharge transistor 129 that discharges the signal charge from the first holder; and vertical scanning circuit 103 that controls discharge transistor 129.

Here, a first accumulation period corresponding to the signal charge held in second holder 127 may be controlled by controlling discharge transistor 129 and first transfer transistor 130 using vertical scanning circuit 103.

Here, vertical scanning circuit 103 may control first transfer transistor 130 to transfer the signal charge held in first holder (i.e., second photodiode 126) to second holder 127 in segments in one frame period.

Here, solid-state imaging apparatus 100 may further include a first adder that adds the signal charge of first photodiode 120 and the signal charge held in second holder 127 together.

An imaging method according to the present embodiment is performed in solid-state imaging apparatus 100 including pixel cells 101 arranged in a matrix, each of pixel cells 101 including: first photodiode 120 that accumulates a signal charge generated by photoelectric conversion; second photodiode 126 that functions as a first holder that holds a signal charge that overflows from first photodiode 120; second holder 127; and first transfer transistor 130 that transfers the signal charge held in the first holder to second holder 127. The imaging method includes: exposing first photodiode 120; transferring the signal charge that overflows from first photodiode 120 to the first holder; and transferring the signal charge held in the first holder (i.e., second photodiode 126) to second holder 127.

Embodiment 2

Figure 9:
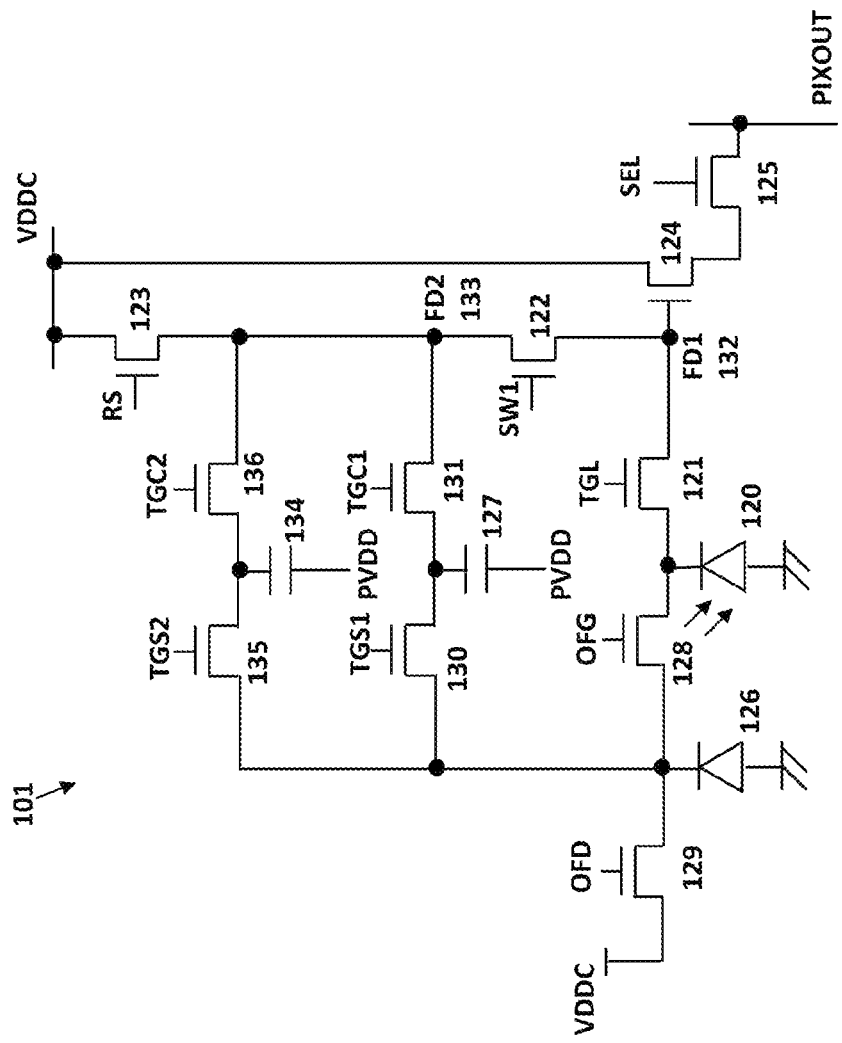
FIG. 9 illustrates an example of a configuration of a pixel included in a solid-state imaging apparatus according to Embodiment 2.

FIG. 9 illustrates an example of a configuration of a pixel included in the solid-state imaging apparatus according to Embodiment 2. Note that the description of FIG. 9 will focus on differences with Embodiment 1.

In FIG. 9, pixel cell 101 according to this circuit example includes, in addition to the configuration example of the pixel included in the solid-state imaging apparatus according to Embodiment 1, storage capacitive element 134, for example, functioning as a third holder, transfer transistor 135, and transfer transistor 136.

For example, each of transistors 135 and 136 may be an N channel MOS transistor.

Transfer transistor 135 is connected between the cathode electrode of second photodiode 126 and storage capacitive element 134. Transfer control line TGS2 is connected to the gate electrode of transfer transistor 135. Transfer transistor 135 turns on when a high-level transfer pulse φTGS2 from transfer control line TGS2 is applied to the gate electrode of transfer transistor 135, whereby the signal charge (specifically, electrons) accumulated in second photodiode 126 is transferred to storage capacitive element 134. Capacitance control line PVDD is connected to the other electrode of storage capacitive element 134.

Transfer transistor 136 is connected to storage capacitive element 134 and FD2 part 133, which is between switching transistor 122 and reset transistor 123. Transfer control line TGC2 is connected to the gate electrode of transfer transistor 136. Transfer transistor 136 turns on when a high-level transfer pulse φTGC2 is applied to the gate electrode of transfer transistor 136 from transfer control line TGC2, whereby the signal charge (specifically, electrons) accumulated in storage capacitive element 134 are transferred to FD2 part 133.

Figure 10:
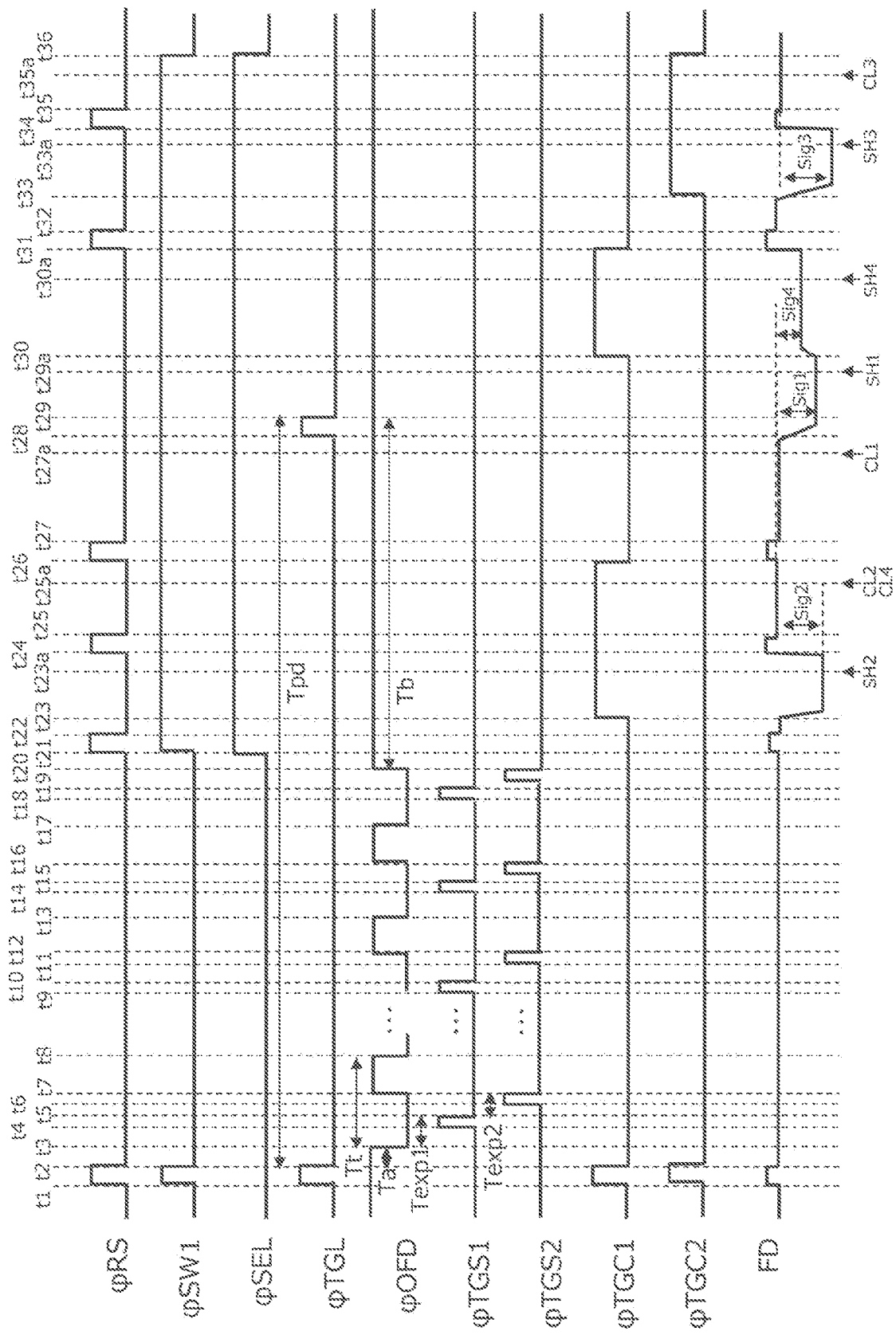
FIG. 10 illustrates a timing chart for explaining operations of a pixel included in the solid-state imaging apparatus according to Embodiment 2.

FIG. 10 illustrates one example of a timing chart for explaining operations performed by the pixel illustrated in FIG. 9.

At time t1, φRS and φSW1 become high-level pulses, whereby power supply voltage AVDD is applied to FD2 part 133 and FD1 part 132. Moreover, φTGL becomes a high-level pulse, whereby the signal charge of first photodiode 120 is discharged. φOFD is also a high-level pulse, so the signal charge of second photodiode 126 is also discharged. φTGC1 and φTGC2 become high-level pulses, whereby power supply voltage AVDD is applied to storage capacitive element 127 and storage capacitive element 134.

At time t2, φRS and φSW1 become low-level pulses. Here, a step in the potential of FD1 part 132 is typically formed due to noise from the switching of reset transistor 123 and switching transistor 122. Moreover, φTGL, φTGC1, and φTGC2 become low-level pulses, whereby signal charge can be accumulated.

At time t3, φOFD becomes a low-level pulse, whereby the signal charge of second photodiode 126 can be accumulated.

At time t4, φTGS1 becomes a high-level pulse, whereby the signal charge is transferred from second photodiode 126 to storage capacitive element 127.

At time t5, φTGS1 becomes a low-level pulse, whereby the transfer of the signal charge from second photodiode 126 to storage capacitive element 127 is completed. Period Texp1 from time t3 to time t5 is equivalent to the accumulation period of storage capacitive element 127.

At time t6, φTGS2 becomes a high-level pulse, whereby the signal charge is transferred from second photodiode 126 to storage capacitive element 134.

At time t7, φTGS2 becomes a low-level pulse, whereby the transfer of the signal charge from second photodiode 126 to storage capacitive element 134 is completed. Period Texp2 from time t5 to time t7 is equivalent to the accumulation period of storage capacitive element 134. Moreover, φOFD becomes a high-level pulse, whereby the signal charge of second photodiode 126 is discharged to the power source.

The pulses of φOFD, φTGS1, and φTGS2 repeat until time t20, as accumulation cycle Tt from time t3 to time t8.

At time t21, φRS and φSW1 become high-level pulses, whereby power supply voltage AVDD is applied to FD2 part 133 and FD1 part 132. φSEL becomes a high-level pulse, whereby selection transistor 125 turns on and the source electrode of amplification transistor 124 and vertical signal line PIXOUT become electrically connected. A constant current flows through amplification transistor 124, forming a source follower. Although not illustrated in this figure, a low-level φSEL pulse is supplied to gate electrodes of selection transistors 125 in other pixels connected to the same vertical signal line PIXOUT, which turns the selection transistors 125 off.

At time t22, φRS and φSW1 become low-level pulses. Here, a step in the potential of FD1 part 132 is typically formed due to noise from the switching of reset transistor 123 and switching transistor 122.

At time t23, φTGC1 becomes a high-level pulse. Here, the signal charge held in storage capacitive element 127 is distributed to FD2 part 133 and FD1 part 132, the potential of FD1 part 132 decreases, and at time t23a when the potential stabilizes, the signal level (SH2) is sampled.

At time t24, φRS becomes a high-level pulse, whereby power supply voltage AVDD is applied to FD2 part 133, FD1 part 132, and storage capacitive element 127.

At time t25, φRS becomes a low-level pulse. Here, at time t25a when the potential of FD1 part 132 stabilizes, the signal level (CL2, CL4) is sampled. In column readout circuit 105, output signal Sig2 of storage capacitive element 127 is extracted from the difference between the signal level (SH2) at time t23a and the signal level (CL2) at time t25a.

At time t26, φTGC1 becomes a low-level signal whereby second transfer transistor 131 turns off, and φRS becomes a high-level signal whereby power supply voltage AVDD is applied to FD2 part 133 and FD1 part 132.

At time t27, φRS becomes a low-level pulse. Here, at time t27a when the potential of FD1 part 132 stabilizes, the signal level (CL1) is sampled.

At time t28, φTGL becomes a high-level pulse. Here, the signal charge is transferred from first photodiode 120 to FD1 part 132, whereby the potential of FD1 part 132 decreases.

At time t29, φTGL becomes a low-level pulse, whereby the transfer of the signal charge from first photodiode 120 to FD1 part 132 is completed. At time t29a, the potential of FD1 part 132 stabilizes, and the signal level (SH1) is sampled. In column readout circuit 105, output signal Sig1 of first photodiode 120 is extracted from the difference between the signal level (CL1) at time t27a and the signal level (SH1) at time t29a.

At time t30, φTGC1 becomes a high-level pulse. Here, in addition to the capacitances of FD1 part 132, switching transistor 122, and FD2 part 133, since the capacitance of second transfer transistor 131 and the capacitance of storage capacitive element 127 increase, compared to at time t29a, conversion efficiency η decreases and the potential of FD1 part 132 increases. At time t30a when the potential of FD1 part 132 stabilizes, the signal level (SH4) is sampled. In column readout circuit 105, output signal Sig4 of first photodiode 120 is extracted from the difference between the signal level (CL4) at time t25a and the signal level (SH4) at time t30a.

At time t31, φTGC1 becomes a low-level signal whereby second transfer transistor 131 turns off, and φRS becomes a high-level signal whereby power supply voltage AVDD is applied to FD2 part 133 and FD1 part 132.

At time t32, φRS becomes a low-level pulse.

At time t33, φTGC2 becomes a high-level pulse. Here, the signal charge held in storage capacitive element 134 is distributed to FD2 part 133 and FD1 part 132, the potential of FD1 part 132 decreases, and at time t33a when the potential of FD1 part 132 stabilizes, the signal level (SH3) is sampled.

At time t34, φRS becomes a high-level pulse, whereby power supply voltage AVDD is applied to FD2 part 133, FD1 part 132, and storage capacitive element 134.

At time t35, φRS becomes a low-level pulse. Here, at time t35a when the potential of FD1 part 132 stabilizes, the signal level (CL3) is sampled. In column readout circuit 105, output signal Sig3 of storage capacitive element 134 is extracted from the difference between the signal level (SH3) at time t33a and the signal level (CL3) at time t35a.

At time t36, φSW1 and φTGC2 become low-level pulses. φSEL becomes a low-level pulse, whereby selection transistor 125 turns off and the source electrode of amplification transistor 124 and vertical signal line PIXOUT become electrically disconnected.

Exposure period Tpd of first photodiode 120 is the period from time t2 at which φTGL becomes a low-level pulse to time t29. On the other hand, accumulation period Tc1' of storage capacitive element 127 in which the signal charge is transferred from second photodiode 126 is expressed as shown in Equation 2, where Ta is defined as the period from time t2 to time t3, and Tb is defined as the period from time t19 to time t24.

$$Tc1'=(Tpd-Ta-Tb)\times Texp1/Tt \qquad \text{Equation 2:}$$

Accumulation period Tc2' in which the signal charge of storage capacitive element 134 is transferred from second photodiode 126 is expressed as shown in Equation 3.

$$Tc2'=(Tpd-Ta-Tb)\times Texp2/Tt \qquad \text{Equation 3:}$$

It is therefore possible to calculate the ratios between exposure period Tpd of first photodiode 120 and accumulation periods Tc1' and Tc2' of storage capacitive element 127 and storage capacitive element 134, respectively, by using Equations 2 and 3 expressing exposure period Tpd and accumulation periods Tc1' and Tc2'.

If the above timing chart is followed, a total of four output signals in different states can be obtained. Output signal Sig1 resulting from converting the signal charge of first photodiode 120 into voltage and output signal Sig4 resulting from turning switching transistor 122 and second transfer transistor 131 on and converting the signal charge of first photodiode 120 into voltage can be obtained. Moreover, output signal Sig2 resulting from converting the signal charge transferred from second photodiode 126 and accumulated in storage capacitive element 127 into voltage and output signal Sig3 resulting from converting the signal charge transferred from second photodiode 126 and accumulated in storage capacitive element 134 into voltage can be obtained.

Figure 11:
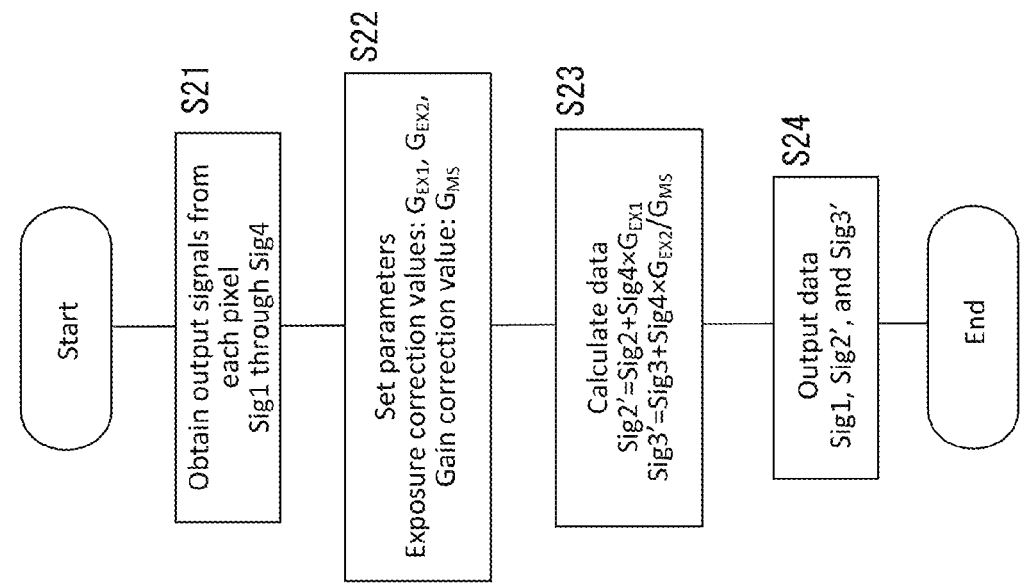
FIG. 11 illustrates a flowchart of signal processing for pixels included in the solid-state imaging apparatus according to Embodiment 2.

FIG. 11 illustrates a flowchart of signal processing for pixels included in the solid-state imaging apparatus according to Embodiment 2. First, as shown in the timing chart in FIG. 10, the output signals of the pixels (Sig1 through Sig4) are obtained (S21). Next, parameter values are set (S22). Exposure correction values $G_{EX1}$ and $G_{EX2}$ are expressed as ratios of exposure time in which the signal charge that overflows from first photodiode 120 to second photodiode 126 is transferred and accumulated to the exposure time of first photodiode 120 ($G_{EX1}$=Tc1'/Tpd; $G_{EX2}$=Tc2'/Tpd). As is illustrated in the timing chart in FIG. 10, this is controlled by the pulse timing of φOFD, φTGS1, and φTGS2. Moreover, the gain correction value is expressed as a ratio of conversion efficiency $\eta_1$ of the conversion of the signal charge amount of storage capacitive element 127 into voltage to conversion efficiency $\eta_2$ of the conversion of the signal charge amount of storage capacitive element 134 into voltage ($G_{MS}=\eta_1/\eta_2$).

Next, data calculation is performed (S23). Data calculation involves performing calculation, for each pixel, using output signal Sig4 of the signal charge of first photodiode 120 and output signal Sig2 of the signal charge accumulated in storage capacitive element 127 in accordance with Equation 4 to obtain pixel signals characterized by subject illuminances ranging from low illuminance to high illuminance.

$$Sig2'=Sig2+Sig4\times G_{EX1} \qquad \text{Equation 4:}$$

Output signal Sig3 of the signal charge accumulated in storage capacitive element 134 is calculated for each pixel using Equation 5.

$$Sig3'=Sig3+Sig4\times G_{EX2}/G_{MS} \qquad \text{Equation 5:}$$

This outputs Sig1, which is the signal charge of first photodiode 120, Sig2', which is the result of processing for calculating the signal of first photodiode 120 and the signal of storage capacitive element 127, and Sig3', which is the result of processing for calculating the signal of first photodiode 120 and the signal of storage capacitive element 134 (S24). Sig1, Sig2', and Sig3' correspond to pixel signals characterized by subject illuminances ranging from low illuminance to high illuminance. Combining Sig1, Sig2', and Sig3' achieves a wider dynamic range.

Figure 12:
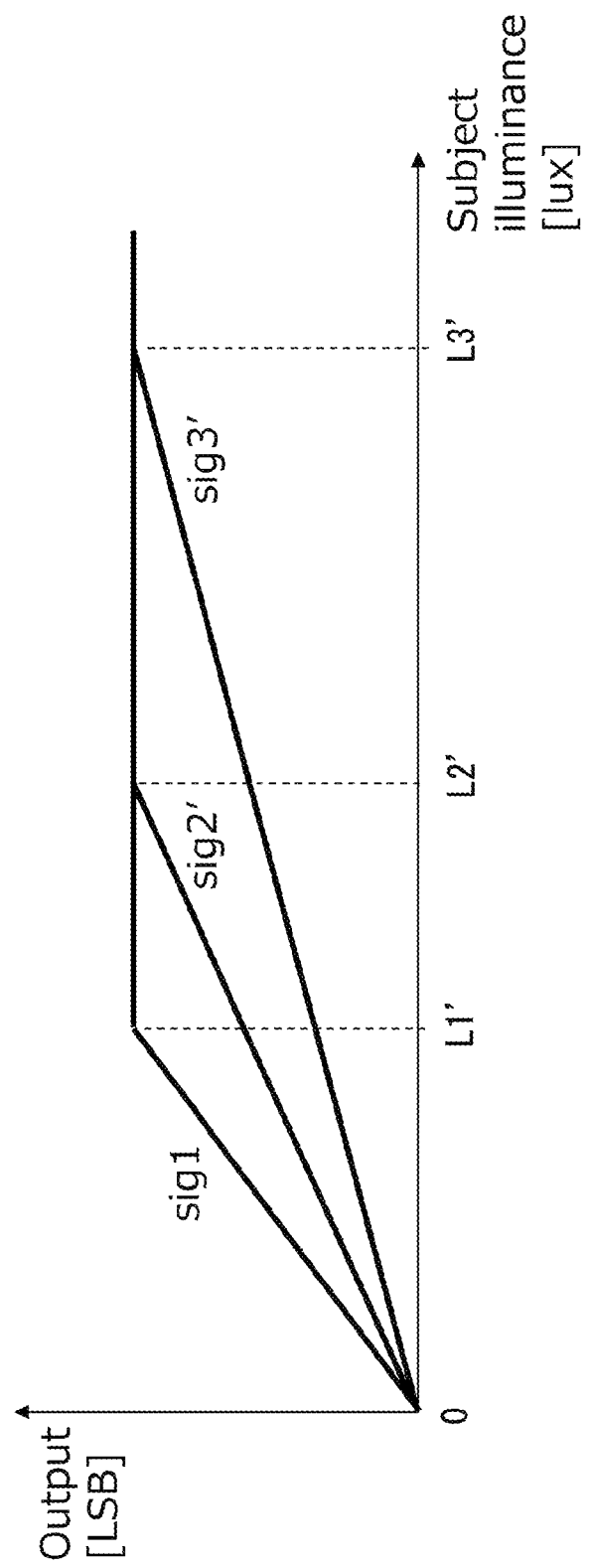
FIG. 12 is a graph illustrating the relationship between the subject illuminance of a pixel included in the solid-state imaging apparatus according to Embodiment 2 and the output signal of the pixel.

FIG. 12 is a graph illustrating the relationship between the subject illuminance of a pixel included in the solid-state imaging apparatus according to Embodiment 2 and the output signal of the pixel. Subject illuminance is represented on the horizontal axis, and output is represented on the vertical axis. FIG. 12 illustrates Sig1, which is the signal charge of first photodiode 120, Sig2', which is the result of processing for calculating the output signal of first photodiode 120 and the output signal of storage capacitive element 127, and Sig3', which is the result of processing for calculating the output signal of first photodiode 120 and the output signal of storage capacitive element 134.

The output value of Sig1 after AD conversion reaches its maximum value at subject illuminance L1' and stays constant regardless of the subject illuminance.

The output value of Sig2' after AD conversion reaches its maximum value at subject illuminance L2' and stays constant regardless of the subject illuminance. Subject illuminance L2' is a higher illuminance than subject illuminance L2 in FIG. 7. This is because it is possible to accumulate in storage capacitive element 127 the signal charge that overflows from first photodiode 120 at a given exposure time ratio. Moreover, with regard to the position of subject illuminance L2', accumulation period Tc1' can be shortened to achieve a gentler incline (a relatively reduced sensitivity) to enable the capturing of higher subject illuminances.

The output value of Sig3' after AD conversion reaches its maximum value at subject illuminance L3' and stays constant regardless of the subject illuminance.

This graph is premised on the capacitance value of storage capacitive element 134 being greater than the capacitance value of storage capacitive element 127 and accumulation period Tc2' being shorter than accumulation period Tc1'. With this, the range of capturable subject illuminance of Sig3' is from 0 to L3, which is wider than Sig2', and even at relatively higher subject illuminances, an amount of signal charge in accordance with the subject illuminance can be obtained. Moreover, with regard to the position of subject illuminance L3', accumulation period Tc2' can be shortened to achieve a gentler incline (a relatively reduced sensitivity) to enable the capturing of higher subject illuminances.

Here, in order to mitigate LED light source flicker, it is necessary to implement continuous exposure or implement intermittent exposure (utilizing charge accumulation) characterized by a cycle of $T_{LED}/2$ or less, where $T_{LED}$ is the pulse cycle of the emission of light by the LED light source. A wide dynamic range is secured with Sig2' and Sig3', and by employing intermittent accumulation at a cycle of $T_{LED}/2$ or less, it is possible to obtain images in which LED light source flicker is mitigated.

By employing intermittent accumulation to control the accumulating of output signals Sig2' and Sig3', it is possible to set optimal accumulation times for various scenes to be captured.

Note that kTC noise is superimposed on output signals Sig2' and Sig3'. The electron-number equivalent of kTC noise expressed using Equation 6.

[Math. 1]

$$Noise_{ktc} = \sqrt{kT/C} * C/q = \sqrt{kTC}/q \quad \text{Equation 6}$$

Since the electron-number equivalent of kTC noise, $Noise_{ktc}$, calculated by Equation 6 is proportional to the square root of capacitance value C, noise increases as capacitance value C increases. As illustrated in FIG. 11, since the range of subject illuminances covered by output signal Sig2' is lower than the range of subject illuminances covered by Sig3' and the photoelectric-converted signal charge is less, the effect kTC noise has on image quality is a concern. Accordingly, the effect that kTC noise has on image quality can be reduced by using a storage capacitive element 127 having a smaller capacitance value than storage capacitive element 134.

As described above, solid-state imaging apparatus 100 according to the present embodiment includes discharge transistor 129 that discharges the signal charge from the first holder (i.e., second photodiode 126), vertical scanning circuit 103 that controls discharge transistor 129, third holder 134 that holds the signal charge transferred from the first holder (second photodiode 126), and transistor 135 that transfers the signal charge from the first holder (second photodiode 126) to third holder 134.

With this, it is possible to both extend the dynamic range and mitigate flicker, as well as capture higher subject illuminances by reducing relative sensitivity.

Here, a second accumulation period corresponding to the signal charge held in second holder 127 may be controlled by controlling (i) discharge transistor 129 or fourth transfer transistor 135 and (ii) first transfer transistor 130 using vertical scanning circuit 103.

Here, a third accumulation period corresponding to the signal charge held in third holder 134 may be controlled by controlling (i) discharge transistor 129 or first transfer transistor 130 and (ii) fourth transfer transistor 135 using vertical scanning circuit 103.

Here, the second accumulation period may be longer than the third storage period.

Here, vertical scanning circuit 103 may control first transfer transistor 130 to transfer the signal charge held in first holder (i.e., second photodiode 126) to second holder 127 in segments in one frame period, and vertical scanning circuit 103 may control fourth transfer transistor 135 to transfer the signal charge held in the first holder to third holder 134 in segments in one frame period.

Here, the capacitance value of second holder 127 may be lower than the capacitance value of third holder 134.

Here, solid-state imaging apparatus 100 may further include: a first corrector that corrects a difference between an exposure period in which first photodiode 120 receives light and performs photoelectric conversion and the second accumulation period corresponding to the signal charge held in second holder 127; a first adder that adds the signal charge of first photodiode 120 and the signal charge held in second holder 127 together; a second corrector that corrects a difference between an exposure period in which first photodiode 120 performs photoelectric conversion and a third accumulation period corresponding to the signal charge held in third holder 134; a gain corrector that corrects a difference between a conversion efficiency at which the signal charge held in second holder 127 is converted into voltage and a conversion efficiency at which the signal charge held in third holder 134 is converted into voltage; and a second adder that adds the signal charge of first photodiode 120 and the signal charge held in third holder 134 together.

Embodiment 3

Figure 13:
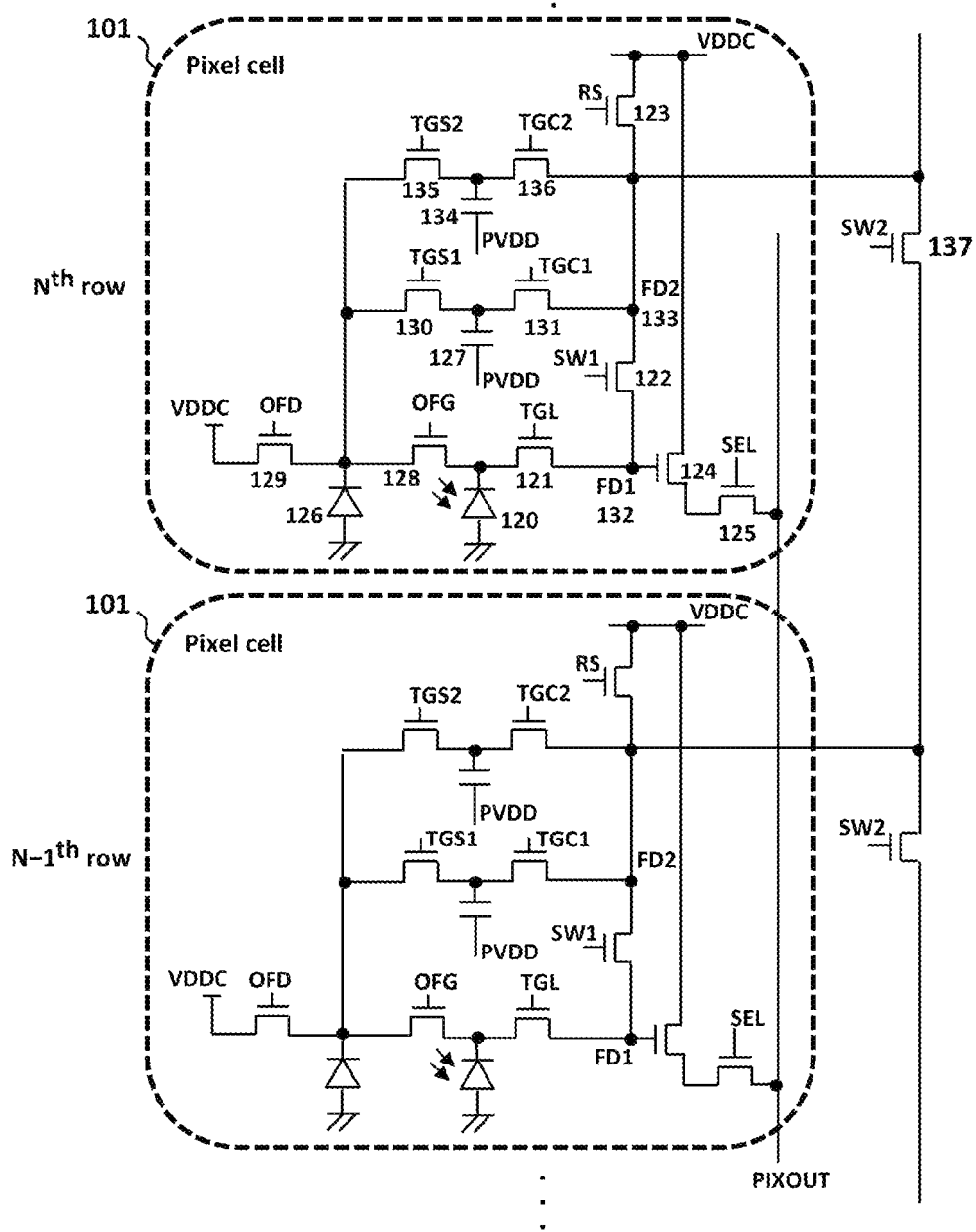
FIG. 13 illustrates an example of a configuration of pixels included in a solid-state imaging apparatus according to Embodiment 3.

FIG. 13 illustrates an example of a configuration of pixels included in the solid-state imaging apparatus according to Embodiment 3. Note that the description of FIG. 13 will focus on differences with Embodiment 2.

In FIG. 13, pixel cell 101 according to this circuit example includes, in addition to the configuration example of the pixel included in the solid-state imaging apparatus according to Embodiment 2, switching transistor 137.

For example, switching transistor 137 may be an N channel MOS transistor.

Switching control line SW2 is connected to the gate of switching transistor 137, FD2 part 133 of the $N^{th}$ row pixel cell 101 and the drain electrode of the $N+1^{th}$ row switching transistor 137 (not illustrated) are connected to the source electrode of switching transistor 137, and FD2 part 133 of the $N-1^{th}$ row pixel cell 101 and the source electrode of the $N-1^{th}$ row switching transistor 137 are connected to the drain electrode of switching transistor 137.

Figure 14:
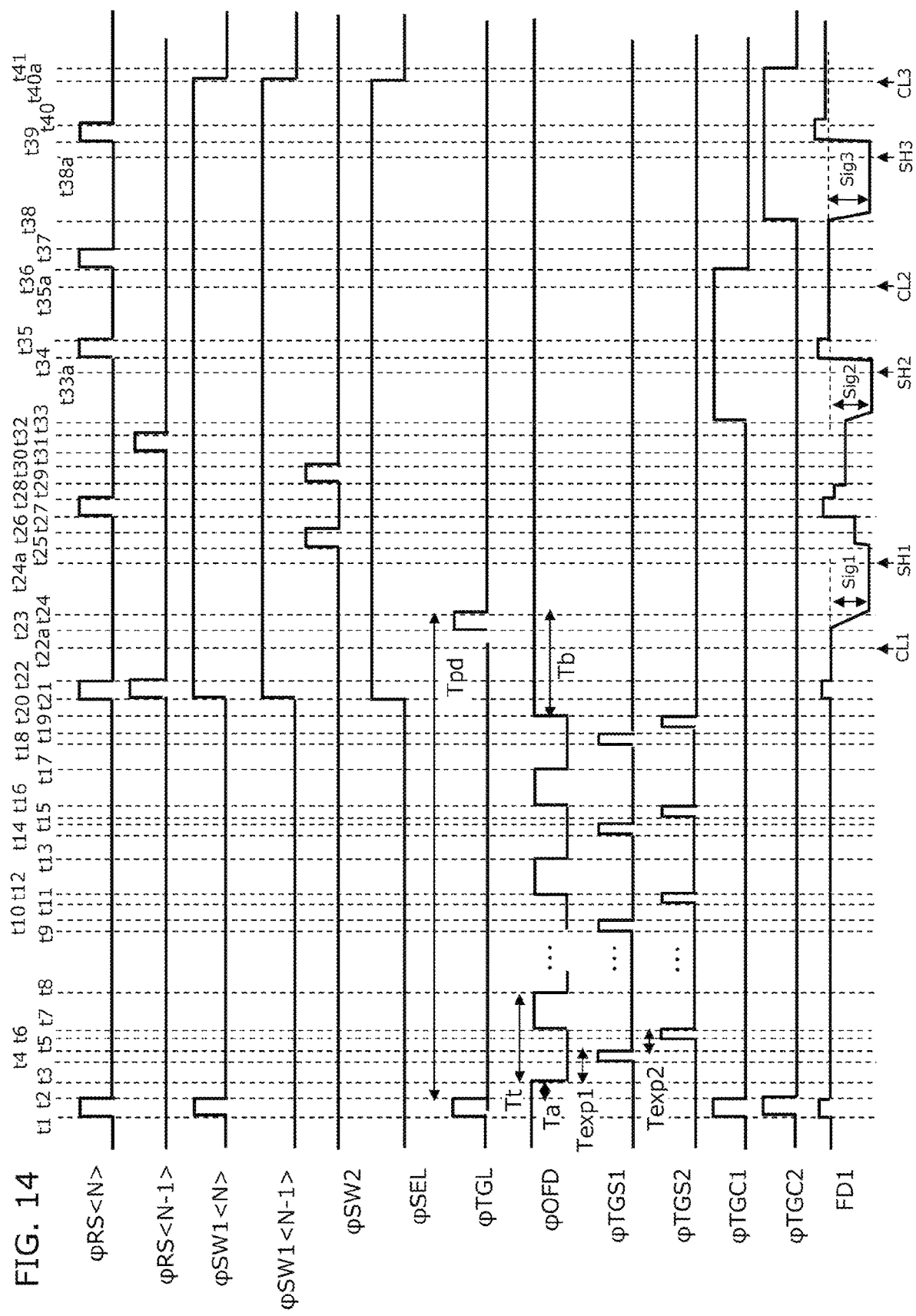
FIG. 14 illustrates a timing chart for explaining operations of pixels included in the solid-state imaging apparatus according to Embodiment 3.

FIG. 14 illustrates one example of a timing chart for explaining operations performed by the pixels illustrated in FIG. 13. As operations performed from time t1 to time t20 are the same as those illustrated in the timing chart in FIG. 10 according to Embodiment 2, repeated description thereof will be omitted. Although FIG. 14 illustrates some drive timings for the $N-1^{th}$ row pixel cell 101, it is assumed that the control pulses for the $N-1^{th}$ row pixel cell 101 that are not illustrated in the timing chart (i.e., φSEL, φSW2, φTGL, φOFD, φTGS1, φTGS2, φTGC1, and φTGC2) maintain their states after time t41.

At time t21, φRS<N>, φSW1<N>, φRS<N−1>, and φSW<N−1> become high-level pulses, whereby power supply voltage AVDD is applied to the $N^{th}$ row and the $N-1^{th}$ row FD2 part 133 and FD1 part 132. φSEL becomes a high-level pulse, whereby selection transistor 125 turns on and the source electrode of amplification transistor 124 and vertical signal line PIXOUT become electrically connected. A constant current flows through amplification transistor 124, forming a source follower. Although not illustrated in this figure, a low-level φSEL pulse is supplied to gate electrodes of selection transistors 125 in other pixels connected to the same vertical signal line PIXOUT, which turns the selection transistors 125 off.

At time t22, φRS<N> and φRS<N−1> become low-level pulses. Here, a step in the potential of FD1 part 132 is typically formed due to noise from the switching of reset transistor 123. Here, at time t22a when the potential of FD1 part 132 stabilizes, the signal level (CL1) is sampled.

At time t23, φTGL becomes a high-level pulse. Here, the signal charge is transferred from first photodiode 120 to FD1 part 132, whereby the potential of FD1 part 132 decreases.

At time t24, φTGL becomes a low-level pulse, whereby the transfer of the signal charge from first photodiode 120 to the FD1 part is completed. At time t24a, the potential of FD1 part 132 stabilizes, and the signal level (SH1) is sampled. In column readout circuit 105, output signal Sig1 of first photodiode 120 is extracted from the difference between the signal level (CL1) at time t22a and the signal level (SH1) at time t24a.

At time t25, φSW2 becomes a high-level pulse, electrically connecting the $N^{th}$ row and the $N-1^{th}$ row FD2 part 133 and FD1 part 132 and distributing the signal charge.

At time t26, φSW2 becomes a low-level pulse, whereby the $N^{th}$ row and $N-1^{th}$ row FD2 parts 133 become electrically disconnected.

At time t27, φRS<N> becomes a high-level pulse, whereby power supply voltage AVDD is applied to FD2 part 133 and FD1 part 132, and the signal charge held in the $N^{th}$ row FD2 part 133 is reset.

At time t28, φRS<N> becomes a low-level pulse, whereby reset transistor 123 is turned off. Based on the principle of charge distribution, signal charge $Q_{fd2}$ held at time t25 by the operations from time t25 to time t27 is expressed by Equation 7, where $C_{fd2\_N}$ is the capacity of the $N^{th}$ row FD2 part 133, switching transistor 122, and FD1 part 132 and $C_{fd2\_N-1}$ is the capacity of the $N-1^{th}$ row FD2 part 133, switching transistor 122, and FD1 part 132.

$$Q_{fd2}'=Q_{fd2}\times C_{fd2\_N-1}/(C_{fd2\_N}+C_{fd2\_N-1}) \quad \text{Equation 7:}$$

At time t29, φSW2 becomes a high-level pulse, electrically connecting the $N^{th}$ row and the $N-1^{th}$ row FD2 parts and distributing the signal charge.

At time t30, φSW2 becomes a low-level pulse, whereby the $N^{th}$ row and $N-1^{th}$ row FD2 parts 133 become electrically disconnected.

At time t31, φRS<N−1> becomes a high-level pulse, whereby power supply voltage AVDD is applied to FD2 part 133 and FD1 part 132, and the signal charge held in the $N-1^{th}$ row FD2 part 133 is reset.

At time t32, φRS<N−1> becomes a low-level pulse, whereby reset transistor 123 is turned off. Based on the principle of charge distribution, signal charge $Q_{fd2}'$ held at time t29 by the operations from time t29 to time t32 is expressed by Equation 8.

$$Q_{fd2}''=Q_{fd2}'\times C_{fd2\_N}/(C_{fd2\_N}+C_{fd2\_N-1}) \quad \text{Equation 8:}$$

Hypothetically, if Equation 8 were calculated when $C_{fd2\_N}=C_{fd2\_N-1}$, signal charge $Q_{fd2}''$ at time t32 would be expressed as $Q_{fd2}''=Q_{fd2}/4$. However, since capacitance values $C_{fd2\_N}$ and $C_{fd2\_N-1}$ are not the same in practice, by alternating the resetting of the signal charges of the $N^{th}$ row and $N-1^{th}$ row FD2 parts 133 accumulated from time t25 to t32, variances in the reset of the signal charges arising from the variances between capacitance values $C_{fd2\_N}$ and $C_{fd2\_N-1}$ are inhibited, whereby driving can be controlled such that signal charge $Q_{fd2}''$ approximates $Q_{fd2}''=Q_{fd2}/4$. For example, assuming $C_{fd2\_N}=1\text{fF}$ and $C_{fd2\_N-1}=1.1\text{fF}$, a case in which the resetting of the signal charges of the $N^{th}$ row and $N-1^{th}$ row FD2 parts 133 is not performed in an alternating manner is equivalent to iterating Equation 8 twice, and signal charge $Q_{fd2}''$ would be expressed as $Q_{fd2}''=\{1/(1+1.1)\}^2\times Q_{fd2}=0.227Q_{fd2}$. However, if the resetting of the signal charges of the $N^{th}$ row and $N-1^{th}$ row FD2 parts 133 were performed in an alternating manner, signal charge $Q_{fd2}''$ would be expressed as $Q_{fd2}''=1\times 1.1/(1+1.1)^2\times Q_{fd2}=0.249Q_{fd2}$, which is closer to the ideal value of $0.25\times Q_{fd2}(=\frac{1}{4}\times Q_{fd2})$.

At time t33, φTGC1 becomes a high-level pulse. Here, the signal charge held in storage capacitive element 127 is mixed with signal charge $Q_{fd2}''$ of first photodiode 120 held in FD2 part 133 and FD1 part 132, the potential of FD1 part 132 decreases, and at time t33a when the potential stabilizes, the signal level (SH2) is sampled. Here, in order to add the signal charge of first photodiode 120 and the signal charge of storage capacitive element 127 to FD1 part 132, it is necessary to set accumulation period Tc1' of storage capacitive element 127 so as to combine the ratio of accumulation period Tc1' to exposure period Tpd of first photodiode 120 (Tc1'/Tpd) and attenuation rate Ggain of the signal charge of first photodiode 120 performed at the drive timings from time t25 to t32. Note that repeating the operations from time t25 to time t32 makes it possible to change attenuation rate Ggain.

At time t34, φRS<N> becomes a high-level pulse, whereby power supply voltage AVDD is applied to FD2 part 133, FD1 part 132, and storage capacitive element 127.

At time t35, φRS<N> becomes a low-level pulse. Here, at time t35a when the potential of FD1 part 132 stabilizes, the signal level (CL2) is sampled. In column readout circuit 105, output signal Sig2 of storage capacitive element 127 is extracted from the difference between the signal level (SH2) at time t33a and the signal level (CL2) at time t35a.

At time t36, φTGC1 becomes a low-level signal whereby second transfer transistor 131 turns off, and φRS<N> becomes a high-level signal whereby power supply voltage AVDD is applied to FD2 part 133 and FD1 part 132.

At time t37, φRS<N> becomes a low-level pulse.

At time t38, φTGC2 becomes a high-level pulse. Here, the signal charge held in storage capacitive element 134 is distributed to FD2 part 133 and FD1 part 132, the potential of FD1 part 132 decreases, and at time t38a when the potential stabilizes, the signal level (SH3) is sampled.

At time t39, φRS<N> becomes a high-level pulse, whereby power supply voltage AVDD is applied to FD2 part 133, FD1 part 132, and storage capacitive element 134.

At time t40, φRS<N> becomes a low-level pulse. Here, at time t40a when the potential of FD1 part 132 stabilizes, the signal level (CL3) is sampled. In column readout circuit 105, output signal Sig3 of storage capacitive element 134 is extracted from the difference between the signal level (SH3) at time t33a and the signal level (CL3) at time t40a.

At time t41, φSW1<N>, φSW<N−1>, and φTGC2 become low-level pulses. φSEL becomes a low-level pulse, whereby selection transistor 125 turns off and the source electrode of amplification transistor 124 and vertical signal line PIXOUT become electrically disconnected.

If the above timing chart is followed, a total of three output signals in different states can be obtained. Output signal Sig1 resulting from converting the signal charge of first photodiode 120 into voltage, output signal Sig2 resulting from adding the signal charge of first photodiode 120 and the signal charge transferred from second photodiode 126 and accumulated in storage capacitive element 127 together at FD1 part 132 and converting that into voltage, and output signal Sig3 resulting from converting the signal charge transferred from second photodiode 126 and accumulated in storage capacitive element 134 into voltage can be obtained.

Figure 15:
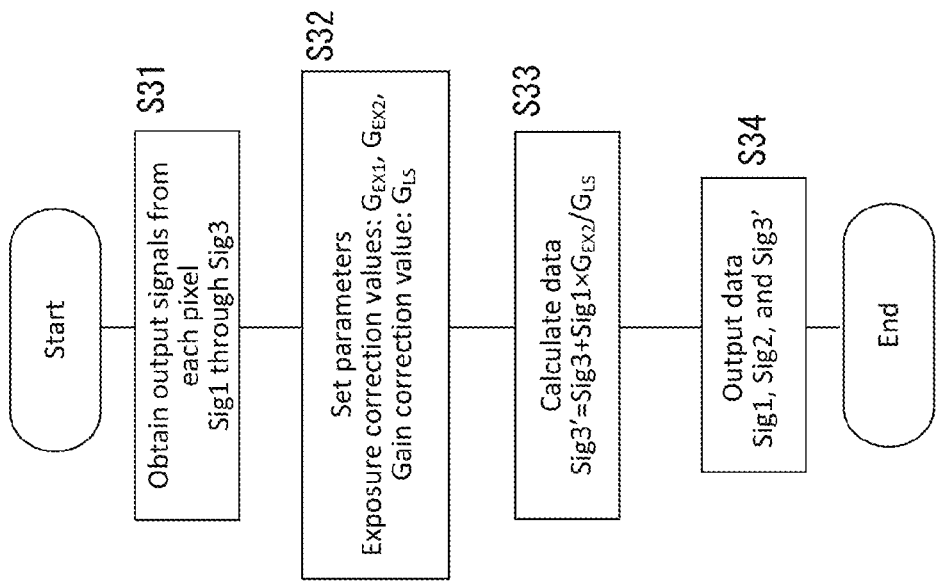
FIG. 15 illustrates a flowchart of signal processing for pixels included in the solid-state imaging apparatus according to Embodiment 3.

FIG. 15 illustrates a flowchart of signal processing for pixels included in the solid-state imaging apparatus according to Embodiment 3. First, as shown in the timing chart in FIG. 14, the output signals of the pixels (Sig1 through Sig3) are obtained (S31). Next, parameter values are set (S32). The parameters include exposure correction values $G_{EX1}$ and $G_{EX2}$ and gain correction value $G_{LS}$. Gain correction value $G_{LS}$ is expressed as a ratio of conversion efficiency $\eta_0$ of the conversion of the signal charge amount of first photodiode 120 into voltage at FD1 part 132 to conversion efficiency $\eta_2$ of the conversion of the signal charge amount of storage capacitive element 134 into voltage ($G_{LS}=\eta_0/\eta_2$).

Next, data calculation is performed (S33). Data calculation involves performing calculation, for each pixel, using output signal Sig1 of the signal charge of first photodiode 120 and output signal Sig3 of the signal charge accumulated in storage capacitive element 134 in accordance with Equation 9 to obtain pixel signals characterized by subject illuminances ranging from low illuminance to high illuminance.

$$\text{Sig3}'=\text{Sig3}+\text{Sig1}\times G_{EX2}/G_{LS}$$ Equation 9:

This outputs Sig1, which is the signal charge of first photodiode 120, Sig2, which is the result of adding the signal of first photodiode 120 and the signal of storage capacitive element 127 together at FD1 part 132, and Sig3', which is the result of processing for calculating the signal of first photodiode 120 and the signal of storage capacitive element 134 (S34). With this, pixel signals characterized by subject illuminances ranging from low illuminance to high illuminance can be obtained. Note that the relationship between the subject illuminance of the pixel and the output signal of the pixel is as illustrated in the graph of FIG. 12; a wide range of subject illuminances can be captured with the output signals Sig1, Sig2, and Sig3'.

Note that Embodiment 3 differs from Embodiment 2 in that signal Sig2 is added at FD1 part 132 by analog addition rather than by the calculation processing in signal processing circuit 107. This makes it possible to reduce the number of output signals from four to three. This in turn makes it possible to reduce drive time and lower energy consumption.

Embodiment 4

Figure 16:
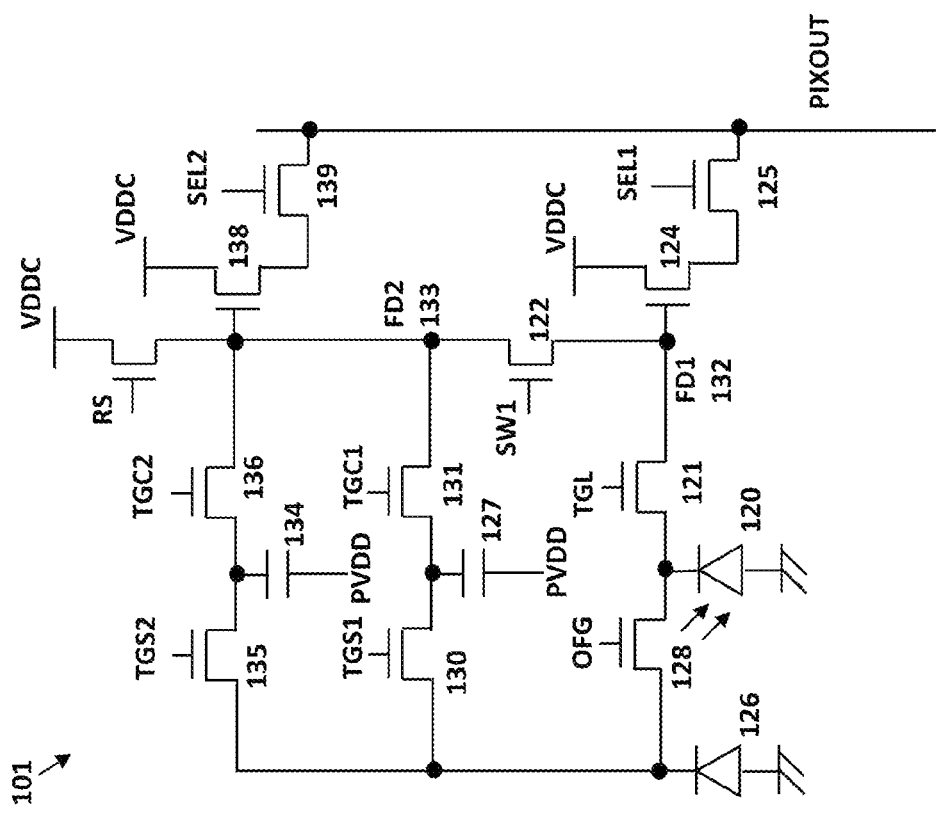
FIG. 16 illustrates an example of a configuration of a pixel included in a solid-state imaging apparatus according to Embodiment 4.

FIG. 16 illustrates an example of a configuration of a pixel included in the solid-state imaging apparatus according to Embodiment 4. Note that the description of FIG. 16 will focus on differences with Embodiment 2.

Pixel cell 101 according to the circuit example illustrated in FIG. 16 differs from the configuration example of the pixel included in the solid-state imaging apparatus according to Embodiment 2 in that discharge transistor 129 is omitted and amplification transistor 138 and selection transistor 139 are included.

For example, amplification transistor 138 and selection transistor 139 may each be an N channel MOS transistor.

The gate electrode of amplification transistor 138 is connected to FD2 part 133, the drain electrode is connected to pixel power supply line VDDC, and the source electrode is connected to the drain electrode of selection transistor 139.

The gate electrode of selection transistor 139 is connected to selection control line SEL2, the drain electrode is connected to the source electrode of amplification transistor 138, and the source electrode is connected to vertical signal line PIXOUT. When a pixel readout row is selected, selection transistor 139 turns on in response to application of a high-level selection pulse φSEL2 from selection control line SEL2, and connects the source electrode of amplification transistor 138 and vertical signal line PIXOUT. Moreover, the gate electrode of selection transistor 125 is connected to selection control line SEL1.

Figure 17:
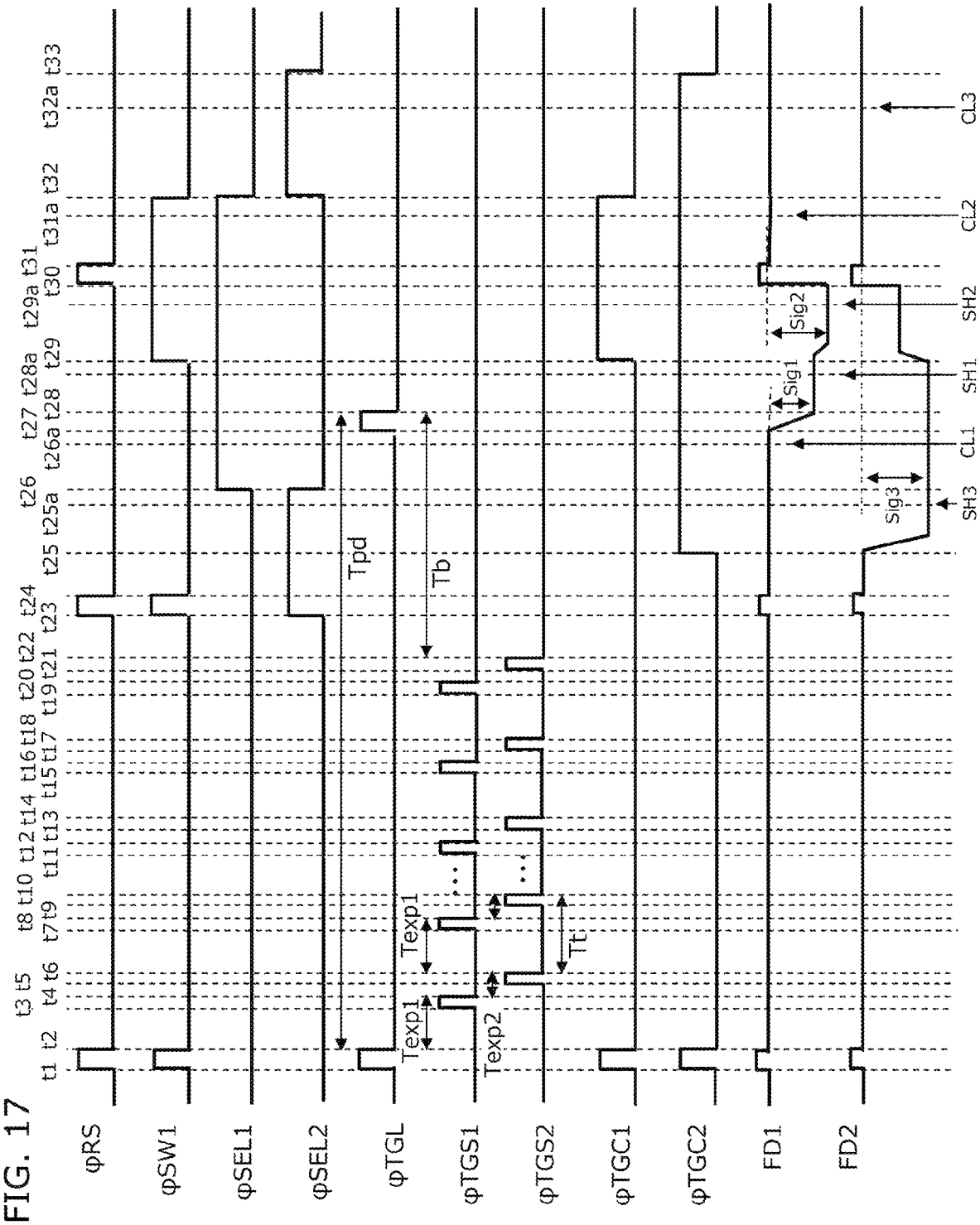
FIG. 17 illustrates a timing chart for explaining operations of a pixel included in the solid-state imaging apparatus according to Embodiment 4.

FIG. 17 illustrates one example of a timing chart for explaining operations performed by the pixel illustrated in FIG. 16.

At time t1, φRS and φSW1 become high-level pulses, whereby power supply voltage AVDD is applied to FD2 part 133 and FD1 part 132. Moreover, φTGL becomes a high-level pulse, whereby the signal charge of first photodiode 120 is discharged. φTGC1 and φTGC2 become high-level pulses, whereby power supply voltage AVDD is applied to storage capacitive element 127 and storage capacitive element 134.

At time t2, φRS and φSW1 become low-level pulses. Here, a step in the potential of the FD1 part is typically formed due to noise from the switching of reset transistor 123 and switching transistor 122. Moreover, φTGL, φTGC1, and φTGC2 become low-level pulses, whereby signal charge can be accumulated.

At time t3, φTGS1 becomes a high-level pulse, whereby the signal charge is transferred from second photodiode 126 to storage capacitive element 127.

At time t4, φTGS1 becomes a low-level pulse, whereby the transfer of the signal charge from second photodiode 126 to storage capacitive element 127 is completed. Period Texp1 from time t2 to time t4 is equivalent to the exposure period of storage capacitive element 127 in accumulation cycle Tt.

At time t5, φTGS2 becomes a high-level pulse, whereby the signal charge is transferred from second photodiode 126 to storage capacitive element 134.

At time t6, φTGS2 becomes a low-level pulse, whereby the transfer of the signal charge from second photodiode 126 to storage capacitive element 134 is completed. Period Texp2 from time t4 to time t6 is equivalent to the exposure period of storage capacitive element 134 in accumulation cycle Tt.

At time t7, φTGS1 becomes a high-level pulse, whereby the signal charge is transferred from second photodiode 126 to storage capacitive element 127.

At time t8, φTGS1 becomes a low-level pulse, whereby the transfer of the signal charge from second photodiode 126 to storage capacitive element 127 is completed. Period Texp1 from time t6 to time t8 is equivalent to the exposure period of storage capacitive element 127 in accumulation cycle Tt.

At time t9, φTGS2 becomes a high-level pulse, whereby the signal charge is transferred from second photodiode 126 to storage capacitive element 134.

At time t10, φTGS2 becomes a low-level pulse, whereby the transfer of the signal charge from second photodiode 126 to storage capacitive element 134 is completed. Period Texp2 from time t8 to time t10 is equivalent to the exposure period of storage capacitive element 134 in accumulation cycle Tt.

The pulses of φTGS1 and φTGS2 repeat until time t22, as accumulation cycle Tt from time t6 to time t10.

At time t23, φRS and φSW1 become high-level pulses, whereby power supply voltage AVDD is applied to FD2 part 133 and FD1 part 132. φSEL2 becomes a high-level pulse, whereby selection transistor 139 turns on and the source electrode of amplification transistor 138 and vertical signal line PIXOUT become electrically connected. A constant current flows through amplification transistor 138, forming a source follower. Although not illustrated in this figure, low-level φSEL1 and φSEL2 pulses are supplied to gate electrodes of selection transistors 125 and selection transistors 139 in other pixels connected to the same vertical signal line PIXOUT, which turns the selection transistors 125 and selection transistors 139 off.

At time t24, φRS and φSW1 become low-level pulses. Here, steps in the potentials of FD1 part 132 and FD2 part 133 are typically formed due to noise from the switching of reset transistor 123 and switching transistor 122.

At time t25, φTGC2 becomes a high-level pulse. Here, the signal charge held in storage capacitive element 134 is distributed to FD2 part 133, the potential of FD2 part 133 decreases, and at time t25a when the potential stabilizes, the signal level (SH3) is sampled.

At time t26, φSEL2 becomes a low-level pulse whereby selection transistor 139 turns off, φSEL1 becomes a high-level pulse whereby selection transistor 125 turns on, and the source electrode of amplification transistor 124 and vertical signal line PIXOUT become electrically connected. A constant current flows through amplification transistor 124, forming a source follower. Here, at time t26a when the potential of vertical signal line PIXOUT stabilizes, the signal level (CL1) is sampled.

At time t27, φTGL becomes a high-level pulse. Here, the signal charge is transferred from first photodiode 120 to FD1 part 132, whereby the potential of FD1 part 132 decreases.

At time t28, φTGL becomes a low-level pulse, whereby the transfer of the signal charge from first photodiode 120 to FD1 part 132 is completed. At time t28a when the potential of FD1 part 132 stabilizes, the signal level (SH1) is sampled. In column readout circuit 105, output signal Sig1 of first photodiode 120 is extracted from the difference between the signal level (CL1) at time t26a and the signal level (SH1) at time t28a.

At time t29, φSW1 becomes a high-level pulse. At this time, the signal charge transferred from first photodiode 120 to FD1 part 132 and the signal charge accumulated in storage capacitive element 134 that is held in FD2 part 133 are added together. Moreover, φTGC1 becomes a high-level pulse, whereby the signal charge accumulated in storage capacitive element 127 is added in FD2 part 133 and FD1 part 132. The potential of FD1 part 132 decreases, and the signal level (SH2) is sampled when the potential stabilizes at time t29a.

At time t30, φRS becomes a high-level pulse, whereby power supply voltage AVDD is applied to FD2 part 133 and FD1 part 132, and the signal charge is discharged to the power supply voltage.

At time t31, φRS becomes a low-level pulse. Here, at time t31a when the potential of FD1 part 132 stabilizes, the signal level (CL2) is sampled. In column readout circuit 105, output signal Sig2, which is obtained by adding the signal charges of storage capacitive element 127, storage capacitive element 134, and first photodiode 120 together, is extracted from the difference between the signal level (SH2) at time t29a and the signal level (CL2) at time t31a.

At time t32, φSW1 becomes a low-level pulse whereby switching transistor 122 turns off. Moreover, φTGC1 becomes a low-level pulse whereby second transfer transistor 131 turns off. φSEL1 becomes a low-level pulse whereby selection transistor 125 turns off, φSEL2 becomes a high-level pulse whereby selection transistor 139 turns on, and the source electrode of amplification transistor 138 and vertical signal line PIXOUT become electrically connected. At time t32a when the potential of vertical signal line PIXOUT stabilizes, the signal level (CL3) is sampled. In column readout circuit 105, output signal Sig3 of storage capacitive element 134 is extracted from the difference between the signal level (SH3) at time t25a and the signal level (CL3) at time t32a.

At time t33, φTGC2 becomes a low-level pulse. Moreover, φSEL2 becomes a low-level pulse, whereby selection transistor 139 turns off and the source electrode of amplification transistor 138 and vertical signal line PIXOUT become electrically disconnected.

Exposure period Tpd of first photodiode 120 is the period from time t2 at which φTGL becomes a low-level pulse to time t28. On the other hand, accumulation period Tc1″ of storage capacitive element 127 in which the signal charge is transferred from second photodiode 126 is expressed as shown in Equation 10, where Tb is defined as the period from time t21 to time t24, and Tt is defined as the accumulation cycle.

$$Tc1''=(Tpd-Tb)\times Texp1/Tt \qquad \text{Equation 10:}$$

Accumulation period Tc2″ in which the signal charge of storage capacitive element 134 is transferred from second photodiode 126 is expressed as shown in Equation 11.

$$Tc2''=(Tpd-Tb)\times Texp2/Tt \qquad \text{Equation 11:}$$

The sum value of accumulation period Texp1 of storage capacitive element 127 and accumulation period Texp2 of storage capacitive element 134 is equal to accumulation cycle Tt (=Texp1+Texp2). Accordingly, the accumulation period corresponding to the sum value of the signal charge accumulated in storage capacitive element 127 and the signal charge accumulated in storage capacitive element 134 is expressed as shown in Equation 12.

$$Tc3=Tc1''+Tc2''=Tpd-Tb \quad \text{Equation 12:}$$

Since Tb is usually extremely small relative to exposure period Tpd of first photodiode 120, one can see that the accumulation period of the signal charges accumulated in storage capacitive element 127 and storage capacitive element 134 is approximately the same as the exposure period of first photodiode 120. In other words, when the signal charge accumulated in storage capacitive element 127 and the signal charge accumulated in storage capacitive element 134 are added together, the accumulation period becomes approximately equal to the exposure period of first photodiode 120, so it is possible to add the signal charge of storage capacitive element 127, the signal charge of storage capacitive element 134, and the signal charge of first photodiode 120 together in FD1 part 132 and FD2 part 133. This makes it possible to obtain output signal Sig2 characterized by favorable linearity characteristics.

If the above timing chart is followed, a total of three output signals in different states can be obtained. Output signal Sig1 resulting from converting the signal charge of first photodiode 120 into voltage, output signal Sig2 resulting from adding the signal charge of first photodiode 120, the signal charge transferred from second photodiode 126 and accumulated in storage capacitive element 127, and the signal charge transferred from second photodiode 126 and accumulated in storage capacitive element 134 together and converting that into voltage, and output signal Sig3 resulting from converting the signal charge transferred from second photodiode 126 and accumulated in storage capacitive element 134 into voltage can be obtained. The signal processing flow for the output signals is as illustrated in FIG. 15. With the signal processing flow illustrated in FIG. 15, output signals Sig1, Sig2, and Sig3' are output as data. The relationship between the subject illuminance of the pixel and the output signal of the pixel is as illustrated in the graph of FIG. 12; a wide range of subject illuminances can be captured with the output signals Sig1, Sig2, and Sig3'.

As described above, solid-state imaging apparatus 100 according to the present embodiment includes a pixel array including pixel cells arranged in a matrix. Each of the pixel cells includes: a photoelectric conversion element that accumulates a signal charge generated by receiving light and performing photoelectric conversion; a first transfer transistor that transfers the signal charge to a first floating diffusion part; a first holder that holds the signal charge that overflows from the photoelectric conversion element; a second holder; a second transfer transistor that transfers the signal charge held in the first holder to the second holder; a third transfer transistor that transfers a signal charge from the second holder to a second floating diffusion part; a third holder that holds the signal charge transferred from the first holder; a fourth transfer transistor that transfers the signal charge from the first holder to the third holder; a fifth transfer transistor that transfers a signal charge from the third holder to the floating diffusion part; a switching transistor that electrically connects the first floating diffusion part and the second floating diffusion part; a reset transistor that resets the first floating diffusion part and the second floating diffusion part; a first amplification transistor connected to the first floating diffusion part that outputs an amplified signal according to the signal charge amount; a first selection transistor connected to the first amplification transistor; a second amplification transistor connected to the second floating diffusion part that outputs an amplified signal according to the signal charge amount; and a second selection transistor connected to the second amplification transistor.

Embodiment 5

Figure 18:
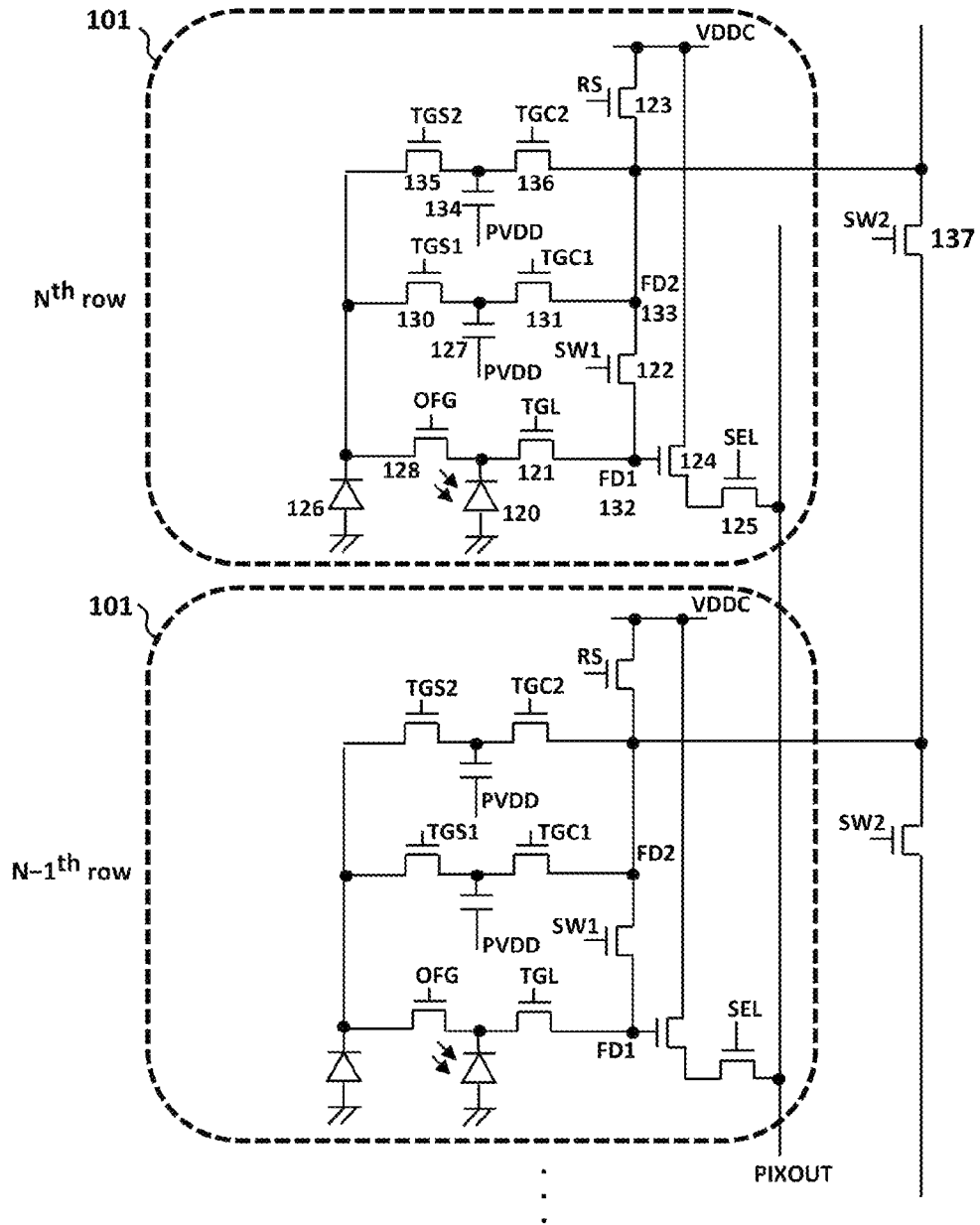
FIG. 18 illustrates an example of a configuration of pixels included in a solid-state imaging apparatus according to Embodiment 5.

FIG. 18 illustrates an example of a configuration of pixels included in the solid-state imaging apparatus according to Embodiment 5. Note that the description of FIG. 18 will focus on differences with Embodiment 4.

Pixel cell 101 according to the circuit example illustrated in FIG. 18 differs from the configuration example of the pixel included in the solid-state imaging apparatus according to Embodiment 4 in that switching transistor 137 is included and amplification transistor 138 and selection transistor 139 are omitted. For example, switching transistor 137 may be an N channel MOS transistor.

Switching control line SW2 is connected to the gate of switching transistor 137, FD2 part 133 of the $N^{th}$ row pixel cell 101 and the drain electrode of the $N+1^{th}$ row switching transistor 137 (not illustrated) are connected to the source electrode of switching transistor 137, and FD2 part 133 of the $N-1^{th}$ row pixel cell 101 and the source electrode of the $N-1^{th}$ row switching transistor 137 are connected to the drain electrode of switching transistor 137.

Figure 19:
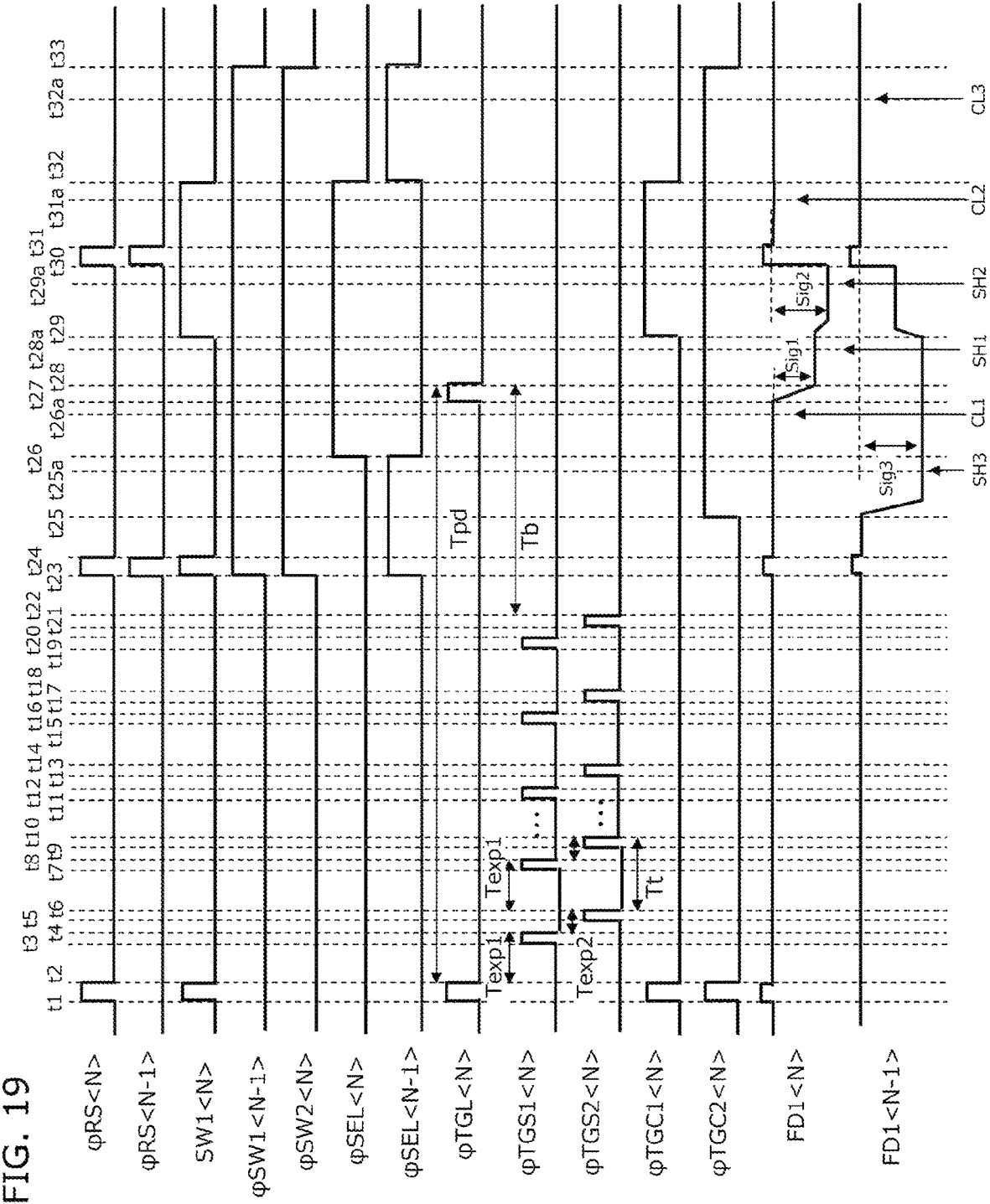
FIG. 19 illustrates a timing chart for explaining operations of pixels included in the solid-state imaging apparatus according to Embodiment 5.

FIG. 19 illustrates one example of a timing chart for explaining operations performed by the pixels illustrated in FIG. 18. As the driving timings from time t1 to time t22 are the same as those illustrated in the timing chart in FIG. 17, repeated description thereof will be omitted, and only the differences will be described. Note that regarding the $N-1^{th}$ row φTGL<N−1>, φTGS1<N−1>, TGS2<N−1>, TGC1<N−1>, and TGC2<N−1> pulses, operations relative to the $N^{th}$ row pixel cell will be described as low-level pulses. Moreover, the $N^{th}$ row FD1 part 132 is denoted as FD1<N>, the $N^{th}$ row FD2 part 133 is denoted as FD2<N>, the $N-1^{th}$ row FD1 part 132 is denoted as FD1<N−1>, and the $N-1^{th}$ row FD2 part 133 is denoted as FD2<N−1>.

At time t23, φRS<N>, φSW1<N>, φRS<N−1>, and φSW1<N−1> become high-level pulses, whereby power supply voltage AVDD is applied to FD1<N>, FD2<N>, FD1<N−1>, and FD2<N−1> in the $N^{th}$ row and $N-1^{th}$ row pixel cells. Moreover, φSW2<N> becomes a high-level pulse, whereby FD2<N> and FD2<N−1> become connected. Moreover, φSEL<N−1> becomes a high-level pulse, whereby the $N-1^{th}$ row selection transistor 125 turns on and the source electrode of the $N-1^{th}$ row amplification transistor 124 and vertical signal line PIXOUT become electrically connected.

At time t24, φRS<N>, φSW1<N>, and φRS<N−1> become low-level pulses. Here, steps in the potentials of FD1<N> and FD1<N−1> are typically formed due to noise from the switching of reset transistor 123 and switching transistor 122.

At time t25, φTGC2 becomes a high-level pulse. Here, the signal charge held in storage capacitive element 134 is distributed to FD1<N−1>, FD2<N>, and FD2<N−1>, the potential of FD1<N−1> decreases, and at time t25a when the potential stabilizes, the signal level (SH3) is sampled.

At time t26, φSEL<N−1> becomes a low-level pulse whereby the $N-1^{th}$ row selection transistor 125 turns off, φSEL<N> becomes a high-level pulse whereby the $N^{th}$ row selection transistor 125 turns on, and the source electrode of amplification transistor 124 and vertical signal line PIXOUT become electrically connected. A constant current flows through amplification transistor 124, forming a source follower. Here, at time t26a when the potential of vertical signal line PIXOUT stabilizes, the signal level (CL1) is sampled.

At time t27, φTGL<N> becomes a high-level pulse. Here, the signal charge is transferred from first photodiode 120 to FD1<N>, whereby the potential of FD1<N> decreases.

At time t28, φTGL<N> becomes a low-level pulse, whereby the transfer of the signal charge from first photodiode 120 to FD1<N> is completed. At time t28a when the potential of FD1<N> stabilizes, the signal level (SH1) is sampled. In column readout circuit 105, output signal Sig1 of first photodiode 120 is extracted from the difference between the signal level (CL1) at time t26a and the signal level (SH1) at time t28a.

At time t29, φSW1<N> becomes a high-level pulse. At this time, the signal charge transferred from first photodiode 120 to FD1<N> and the signal charge accumulated in storage capacitive element 134 that is held in FD2<N> are added together. Moreover, φTGC1<N> becomes a high-level pulse, whereby the signal charge accumulated in storage capacitive element 127 is added in FD2<N> and FD1<N>. The potential of FD1<N> decreases, and the signal level (SH2) is sampled when the potential stabilizes at time t29a.

At time t30, φRS<N> and φRS<N−1> become high-level pulses, whereby power supply voltage AVDD is applied to the $N^{th}$ row and $N-1^{th}$ row FD2 part 133 and FD1<N>, and the signal charge is discharged to the power supply voltage.

At time t31, φRS<N> and φRS<N−1> become low-level pulses. Here, at time t31a when the potential of FD1<N> stabilizes, the signal level (CL2) is sampled. In column readout circuit 105, output signal Sig2, which is obtained by adding the signal charges of storage capacitive element 127, storage capacitive element 134, and first photodiode 120 together, is extracted from the difference between the signal level (SH2) at time t29a and the signal level (CL2) at time t31a.

At time t32, φSW1<N> becomes a low-level pulse, and the $N^{th}$ row switching transistor 122 turns off. Moreover, φTGC1<N> becomes a low-level pulse, and second transfer transistor 131 turns off. φSEL<N> becomes a low-level pulse whereby the $N^{th}$ row selection transistor 125 turns off, φSEL<N−1> becomes a high-level pulse whereby the $N-1^{th}$ row selection transistor 125 turns on, and the source electrode of amplification transistor 124 and vertical signal line PIXOUT become electrically connected. At time t32a when the potential of vertical signal line PIXOUT stabilizes, the signal level (CL3) is sampled. In column readout circuit 105, output signal Sig3 of storage capacitive element 134 is extracted from the difference between the signal level (SH3) at time t25a and the signal level (CL3) at time t32a.

At time t33, φTGC2<N> becomes a low-level pulse. φSEL<N−1> becomes a low-level pulse, whereby the $N-1^{th}$ row selection transistor 125 turns off and the source electrode of amplification transistor 124 and vertical signal line PIXOUT become electrically disconnected.

Just like in Embodiment 4, the accumulation period of the signal charges accumulated in storage capacitive element 127 and storage capacitive element 134 is approximately equal to the exposure period of first photodiode 120. With this, when the signal charge accumulated in storage capacitive element 127 and the signal charge accumulated in storage capacitive element 134 are added together, the accumulation period becomes approximately equal to the exposure period of first photodiode 120, so it is possible to add the signal charge of storage capacitive element 127, the signal charge of storage capacitive element 134, and the signal charge of first photodiode 120 together in FD1 part 132 and FD2 part 133. This makes it possible to obtain output signal Sig2 characterized by favorable linearity characteristics.

If the above timing chart is followed, a total of three output signals in different states can be obtained. Output signal Sig1 resulting from converting the signal charge of first photodiode 120 into voltage, output signal Sig2 resulting from adding the signal charge of first photodiode 120, the signal charge transferred from second photodiode 126 and accumulated in storage capacitive element 127, and the signal charge transferred from second photodiode 126 and accumulated in storage capacitive element 134 together and converting that into voltage, and output signal Sig3 resulting from converting the signal charge transferred from second photodiode 126 and accumulated in storage capacitive element 134 into voltage can be obtained. The signal processing flow for the output signals is as illustrated in FIG. 15. With the signal processing flow illustrated in FIG. 15, output signals Sig1, Sig2, and Sig3' are output as data. The relationship between the subject illuminance of the pixel and the output signal of the pixel is as illustrated in the graph of FIG. 12; a wide range of subject illuminances can be captured with the output signals Sig1, Sig2, and Sig3'.

The advantage with Embodiment 4 is that a plurality of amplification transistors and selection transistors need not be provided in pixel cell 101. This makes it possible to miniaturize the structure and increase the surface area of first photodiode 120 since the number of transistors in pixel cell 101 can be reduced.

As described above, solid-state imaging apparatus 100 according to the present embodiment includes a pixel array including pixel cells arranged in a matrix. Each of the pixel cells includes: a photoelectric conversion element that accumulates a signal charge generated by receiving light and performing photoelectric conversion; a first transfer transistor that transfers the signal charge to a first floating diffusion part; a first holder that holds the signal charge that overflows from the photoelectric conversion element; a second holder; a second transfer transistor that transfers the signal charge held in the first holder to the second holder; a third transfer transistor that transfers a signal charge from the second holder to a second floating diffusion part; a third holder that holds the signal charge transferred from the first holder; a fourth transfer transistor that transfers the signal charge from the first holder to the third holder; a fifth transfer transistor that transfers a signal charge from the third holder to the floating diffusion part; a first switching transistor that electrically connects the first floating diffusion part and the second floating diffusion part; a reset transistor that resets the first floating diffusion part and the second floating diffusion part; a first amplification transistor connected to the first floating diffusion part that outputs an amplified signal according to the signal charge amount; a first selection transistor connected to the first amplification transistor; and second switching transistor that connects the second floating diffusion part that outputs an amplification signal according to the signal charge amount and the second floating diffusion part in a different pixel cell.

Embodiment 6

Figure 20:
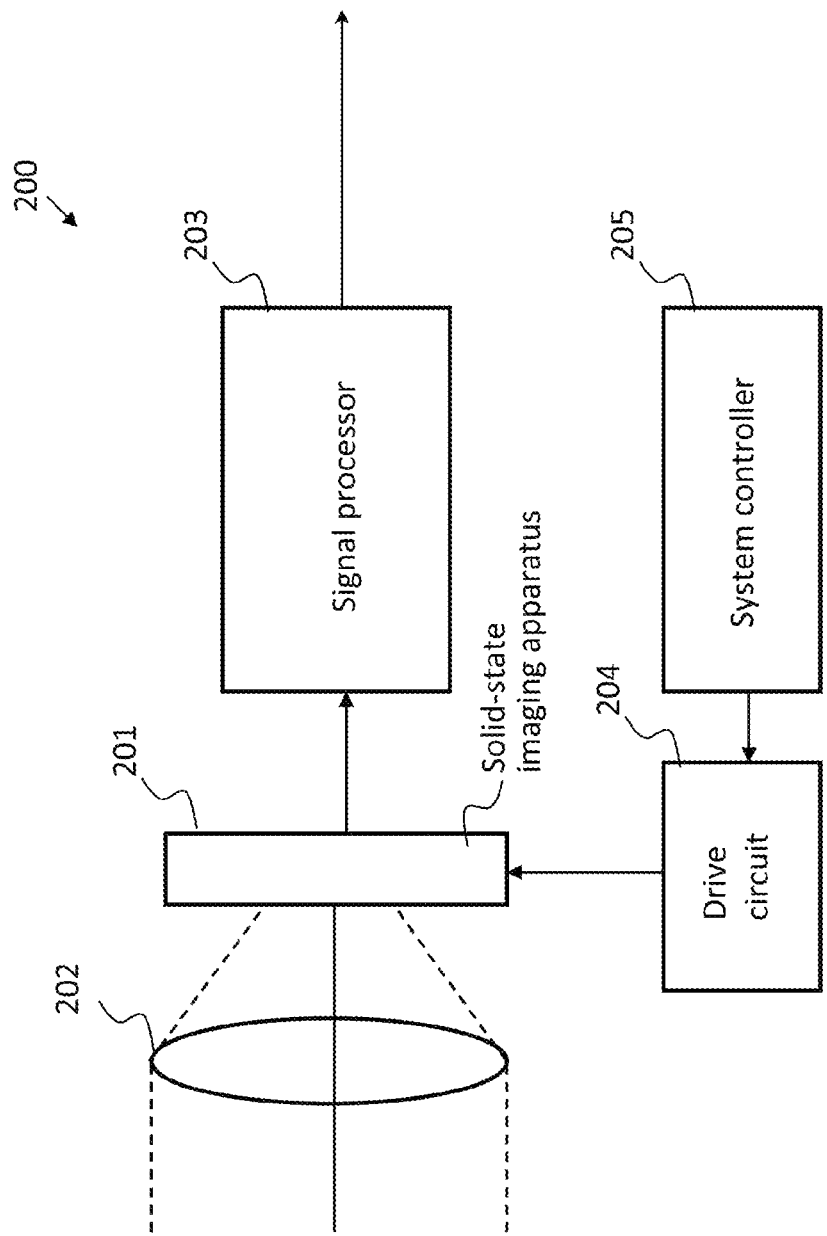
FIG. 20 illustrates an example of a configuration of an imaging apparatus (camera system) in which the solid-state imaging apparatus according to the embodiments is implemented.

FIG. 20 illustrates an example of a configuration of an imaging apparatus (camera system) in which solid-state imaging apparatus 100 according to the embodiments is implemented. The imaging apparatus illustrated in FIG. 20 includes solid-state imaging apparatus 201, imaging optical system 202 including a lens, signal processor 203, drive circuit 204, and system controller 205.

In imaging apparatus 200 illustrated in FIG. 20, solid-state imaging apparatus 100 according to Embodiments 1 through 5 (including variations) is used as solid-state imaging apparatus 201.

Drive circuit 204 receives a control signal in accordance with the drive mode from system controller 205, and supplies a drive mode signal to solid-state imaging apparatus 201. In solid-state imaging apparatus 201 supplied with the drive mode signal, a timing generation circuit (TG 109 in FIG. 1) generates a drive pulse corresponding to the drive mode signal, and supplies it to each block in solid-state imaging apparatus 201.

Signal processor 203 receives an image signal output from solid-state imaging apparatus 201 and performs various signal processing on the image signal.

In this way, the imaging apparatus according to the present embodiment includes the above-described solid-state imaging apparatus 100, imaging optical system 202 that guides incident light from a subject to solid-state imaging apparatus 100, and signal processor 203 that processes an output signal from solid-state imaging apparatus 100.

INDUSTRIAL APPLICABILITY

The solid-state imaging apparatus, the imaging apparatus that uses the solid-state imaging apparatus as an imaging device, and the imaging method according to the present disclosure are suitably applicable to, for example, video cameras and digital cameras.

The invention claimed is:

1. A solid-state imaging apparatus comprising pixel cells arranged in a matrix,
wherein each of the pixel cells includes:
a first photodiode that accumulates a signal charge generated by photoelectric conversion;
a second photodiode that functions as a first holder that holds a signal charge that overflows from the first photodiode;
a second holder; and
a first transfer transistor that transfers the signal charge held in the first holder to the second holder; and
a first corrector that corrects a difference between an exposure period in which the first photodiode receives light and performs photoelectric conversion and a first accumulation period corresponding to the signal charge held in the second holder.

2. The solid-state imaging apparatus according to claim 1, further comprising:
a floating diffusion part that holds a signal charge; and
a second transfer transistor that transfers a signal charge from the second holder to the floating diffusion part.

3. The solid-state imaging apparatus according to claim 2, further comprising:
a switching transistor between the second transfer transistor and the floating diffusion part.

4. The solid-state imaging apparatus according to claim 1, wherein the second photodiode is a buried photodiode.

5. The solid-state imaging apparatus according to claim 1, wherein the solid-state imaging apparatus includes an incident surface on which light is incident and a non-incident surface that are on opposite sides of the solid-state imaging apparatus, and
the solid-state imaging apparatus further comprises, on a non-incident surface side of the second photodiode, an impurity diffusion region as a transfer channel that guides the signal charge that overflows from the first photodiode to the second photodiode.

6. The solid-state imaging apparatus according to claim 1, further comprising:
an overflow transistor that guides the signal charge that overflows from the first photodiode to the second photodiode.

7. The solid-state imaging apparatus according to claim 1, further comprising:
a light-shielding film that shields the second photodiode from light.

8. The solid-state imaging apparatus according to claim 1, further comprising:
a discharge transistor that discharges the signal charge from the first holder; and
a vertical scanning circuit that controls the discharge transistor.

9. The solid-state imaging apparatus according to claim 8, wherein a first accumulation period corresponding to the signal charge held in the second holder is controlled by controlling the discharge transistor and the first transfer transistor using the vertical scanning circuit.

10. The solid-state imaging apparatus according to claim 8, wherein the vertical scanning circuit controls the first transfer transistor to transfer the signal charge held in the first holder to the second holder in segments in one frame period.

11. The solid-state imaging apparatus according to claim 1, further comprising:
a first adder that adds the signal charge of the first photodiode and the signal charge held in the second holder together.

12. A solid-state imaging apparatus comprising pixel cells arranged in a matrix, wherein each of the pixel cells includes:
a first photodiode that accumulates a signal charge generated by photoelectric conversion;
a second photodiode that functions as a first holder that holds a signal charge that overflows from the first photodiode;
a second holder; and
a first transfer transistor that transfers the signal charge held in the first holder to the second holder;
a third holder that holds the signal charge transferred from the first holder; and
a transistor that transfers the signal charge from the first holder to the third holder.

13. The solid-state imaging apparatus according to claim 12, further comprising:
a discharge transistor that discharges the signal charge from the first holder; and
a vertical scanning circuit that controls the discharge transistor,
wherein a second accumulation period corresponding to the signal charge held in the second holder is controlled by controlling (i) the discharge transistor or the transistor and (ii) the first transfer transistor using the vertical scanning circuit.

14. The solid-state imaging apparatus according to claim 13,
wherein a third accumulation period corresponding to the signal charge held in the third holder is controlled by controlling (i) the discharge transistor or the first transfer transistor and (ii) the transistor using the vertical scanning circuit.

15. The solid-state imaging apparatus according to claim 12,
wherein the vertical scanning circuit controls the first transfer transistor to transfer the signal charge held in the first holder to the second holder in segments in one frame period, and
the vertical scanning circuit controls the transistor to transfer the signal charge held in the first holder to the third holder in segments in one frame period.

16. The solid-state imaging apparatus according to claim 12,
wherein a capacitance value of the second holder is lower than a capacitance value of the third holder.

17. The solid-state imaging apparatus according to claim 14, further comprising:
a first corrector that corrects a difference between an exposure period in which the first photodiode receives light and performs photoelectric conversion and the second accumulation period corresponding to the signal charge held in the second holder;
a first adder that adds the signal charge of the first photodiode and the signal charge held in the second holder together;
a second corrector that corrects a difference between an exposure period in which the first photodiode performs photoelectric conversion and a third accumulation period corresponding to the signal charge held in the third holder;
a gain corrector that corrects a difference between a conversion efficiency at which the signal charge held in the second holder is converted into voltage and a conversion efficiency at which the signal charge held in the third holder is converted into voltage; and
a second adder that adds the signal charge of the first photodiode and the signal charge held in the third holder together.

18. An imaging apparatus, comprising:
the solid-state imaging apparatus according to claim 1;
an imaging optical system that guides incident light from a subject to the solid-state imaging apparatus; and
a signal processor that processes an output signal from the solid-state imaging apparatus.

19. An imaging method performed in a solid-state imaging apparatus including pixel cells arranged in a matrix,
each of the pixel cells including:
a first photodiode that accumulates a signal charge generated by photoelectric conversion;
a second photodiode that functions as a first holder that holds a signal charge that overflows from the first photodiode;
a second holder; and
a first transfer transistor that transfers the signal charge held in the first holder to the second holder; and
a first corrector that corrects a difference between an exposure period in which the first photodiode receives light and performs photoelectric conversion and a first accumulation period corresponding to the signal charge held in the second holder,
the imaging method comprising:
exposing the first photodiode;
transferring the signal charge that overflows from the first photodiode to the first holder; and
transferring the signal charge held in the first holder to the second holder.

* * * * *